United States Patent
Benkreira et al.

(12)

(10) Patent No.: US 12,086,823 B2
(45) Date of Patent: Sep. 10, 2024

(54) COMPUTER-BASED SYSTEMS INCLUDING MACHINE LEARNING MODELS TRAINED ON DISTINCT DATASET TYPES AND METHODS OF USE THEREOF

(71) Applicant: Capital One Services, LLC, McLean, VA (US)

(72) Inventors: Abdelkader M'Hamed Benkreira, New York, NY (US); Michael Mossoba, Arlington, VA (US); Joshua Edwards, Philadelphia, PA (US)

(73) Assignee: Capital One Services, LLC, McLean, VA (US)

( * ) Notice: Subject to any disclaimer, the term of this patent is extended or adjusted under 35 U.S.C. 154(b) by 161 days.

(21) Appl. No.: 17/683,287

(22) Filed: Feb. 28, 2022

(65) Prior Publication Data

US 2022/0188574 A1 Jun. 16, 2022

Related U.S. Application Data

(63) Continuation of application No. 16/781,718, filed on Feb. 4, 2020, now Pat. No. 11,263,486.

(51) Int. Cl.
*G06Q 30/02* (2023.01)
*G06F 16/95* (2019.01)
(Continued)

(52) U.S. Cl.
CPC ....... *G06Q 30/0206* (2013.01); *G06F 16/951* (2019.01); *G06F 16/9537* (2019.01);
(Continued)

(58) Field of Classification Search
CPC ..................................................... G06N 20/00
See application file for complete search history.

(56) References Cited

U.S. PATENT DOCUMENTS 7,010,494 B2 * 3/2006 Etzioni .............. G06Q 30/0283
705/7.31
8,296,221 B1 * 10/2012 Waelbroeck ........... G06Q 40/04
705/37

(Continued)

OTHER PUBLICATIONS

Wang, "Modeling Temporal Dynamics of Users' Purchase Behaviors for Next Basket Prediction", 2019 (Year: 2019).*

(Continued)

*Primary Examiner* — Van C Mang
(74) *Attorney, Agent, or Firm* — Greenberg Traurig, LLP

(57) ABSTRACT

In order to facilitate machine learning for prediction using distinct dataset types, systems and methods include collecting content information from archived websites databases. Collecting historical event information from online sources, where the historical event information is associated with a plurality of historical events. Generating event-dependent products training datasets based on the content information and the historical event information, where the event-dependent content training datasets defines for content historical events that are associated with attributes of the content, attribute change of the content, or both. Training an attribute prediction machine learning model based on the event-dependent content training datasets. Applying the trained attribute prediction machine learning model to additional event information to predict, for content, a future attribute estimate, a future attribute change estimate, or both. Causing to display an indication representative of the future attribute estimate, the future attribute change estimate, or both.

20 Claims, 9 Drawing Sheets

(51) Int. Cl.
  *G06F 16/951* (2019.01)
  *G06F 16/9537* (2019.01)
  *G06F 18/21* (2023.01)
  *G06F 18/214* (2023.01)
  *G06N 20/00* (2019.01)
  *G06Q 30/0201* (2023.01)
  *G06Q 30/06* (2023.01)
  *G06Q 30/0601* (2023.01)

(52) U.S. Cl.
  CPC ......... *G06F 18/2148* (2023.01); *G06N 20/00* (2019.01); *G06Q 30/0643* (2013.01)

(56) References Cited

U.S. PATENT DOCUMENTS

| | | | | |
|---|---|---|---|---|
| 8,311,967 B1* | 11/2012 | Lin | ........................ | G06N 20/00 706/45 |
| 2012/0303412 A1* | 11/2012 | Etzioni | ................. | G06Q 30/06 705/7.31 |
| 2018/0060696 A1* | 3/2018 | Chen | .................... | G06K 9/6226 |

OTHER PUBLICATIONS

Wang, "Modeling Temporal Dynamics of User's Purchase Behaviors for Next Basket Prediction", 2019.

* cited by examiner

COMPUTER-BASED SYSTEMS INCLUDING MACHINE LEARNING MODELS TRAINED ON DISTINCT DATASET TYPES AND METHODS OF USE THEREOF

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever. The following notice applies to the software and data as described below and in drawings that form a part of this document: Copyright, Capital One Services, LLC, All Rights Reserved.

FIELD OF TECHNOLOGY

The present disclosure generally relates to improved computer-based systems utilizing machine learning models trained on distinct dataset types.

BACKGROUND OF TECHNOLOGY

A computer network system may include a group of computers (e.g., clients, servers, smart routers) and other computing hardware devices that are linked together through one or more communication channels to facilitate communication and/or resource-sharing, via one or more specifically programmed graphical user interfaces (GUIs).

Data, including features and/or attributes may vary through time in seemingly unpredictable ways. Prediction of the variations in the features and/or attributes through time is very difficult and inaccurate, in part, because using more than one distinct dataset type for machine learning prediction is not typically employed.

SUMMARY OF DESCRIBED SUBJECT MATTER

In some embodiments, the present disclosure provides an exemplary technically improved computer-based method that includes at least the following steps of collecting, by at least one processor, product information for a plurality of products from one or more electronic archived websites record databases, where the product information for each product of the plurality of products includes: i) one or more attributes, and ii) a date associated with each attribute of the one or more attributes. Collecting, by the at least one processor, historical event information from one or more online sources, where the historical event information is associated with a plurality of historical events, where the historical event information includes a date associated with each event of the plurality of historical events. Generating, by the at least one processor, at least one event-dependent products training dataset based at least in part on the product information and the historical event information, where the at least one event-dependent products training dataset defines for at least one product of the plurality of products at least one event of the plurality of historical events that is associated with: (a) at least one attribute of the one or more attributes of the at least one product, (b) at least one attribute change of the at least one product, or (c) both (a) and (b). Training, by the at least one processor, an attribute prediction machine learning model based at least in part on the at least one event-dependent products training dataset to generate a trained attribute prediction machine learning model. Collecting, by the at least one processor, additional event information from the one or more online sources, where the additional event information is associated with one or more additional events, where the additional event information includes a date associated with each event of the one or more additional events. Applying, by the at least one processor, the trained attribute prediction machine learning model to the additional event information to predict, for at least one product of the plurality of products, (a) a future attribute estimate, (b) a future attribute change estimate, or (c) both (a) and (b). Causing to display, by the at least one processor, at least one indication representative of (a) the future attribute estimate, (b) the future attribute change estimate, or (c) both (a) and (b), on a screen of at least one computing device.

In some embodiments, the present disclosure provides an exemplary technically improved computer-based method that includes at least the following steps of collecting, by at least one processor, product information for a plurality of products from one or more electronic archived websites record databases, where the product information for each product of the plurality of products includes: i) one or more attributes, and ii) a date associated with each attribute of the one or more attributes. Collecting, the at least one processor, event information from the plurality of online sources, where the event information is associated with a plurality of events, where the event information includes at least one respective date of each respective event. Applying, by the at least one processor, at least one trained attribute prediction machine learning model to the product information and the event information to predict, for at least one product of the plurality of products, (a) a future attribute estimate, (b) a future attribute change estimate, or (c) both (a) and (b), where an attribute prediction machine learning model is trained based at least in part on at least one event-dependent products training dataset to generate the at least one trained attribute prediction machine learning model, where the at least one event-dependent products training dataset includes at least one subset of selected products of the plurality of products, where the at least one event-dependent products training dataset defines for each respective selected product of the at least one subset of selected products: i) at least one attribute-related historical event that is associated with at least one attribute of a respective selected product, at least one attribute change of the respective selected product, or both, and ii) at least one attribute impact period associated with the at least one attribute-related historical event, and where the at least one attribute impact period identifies a respective time period over which the at least one attribute change associated with the at least one attribute-related historical event has occurred. Causing to display, by the at least one processor, at least one indication representative of the at least one predicted future attribute, at least one predicted future attribute change, or both, on a screen of at least one computing device associated with the user.

In some embodiments, the present disclosure provides an exemplary technically improved computer-based system that includes at least the following components of at least one processor configured to: collect product information for a plurality of products from one or more electronic archived websites record databases; where the product information for each product of the plurality of products includes: i) one or more attributes, and ii) a date associated with each attribute of the one or more attributes; collect historical event information from one or more online sources; where the historical event information is associated with a plurality of historical events; where the historical event information includes a date associated with each event of the plurality of historical events; generate at least one event-dependent products training dataset based at least in part on the product information and the historical event information; where the at least one event-dependent products training dataset defines for at least one product of the plurality of products: at least one event of the plurality of historical events that is associated with (a) at least one attribute of the one or more attributes of the at least one product, (b) at least one attribute change of the at least one product, or (c) both (a) and (b); train an attribute prediction machine learning model based at least in part on the at least one event-dependent products training dataset to generate a trained attribute prediction machine learning model; collect additional event information from the one or more online sources; where the additional event information is associated with one or more additional events; where the additional event information includes a date associated with each event of the one or more additional events; apply the trained attribute prediction machine learning model to the additional event information to predict, for at least one product of the plurality of products, (a) a future attribute estimate, (b) a future attribute change estimate, or (c) both (a) and (b); and cause to display at least one indication representative of (a) the future attribute estimate, (b) the future attribute change estimate, or (c) both (a) and (b), on a screen.

BRIEF DESCRIPTION OF THE DRAWINGS

Various embodiments of the present disclosure can be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

DETAILED DESCRIPTION

Figure 1:
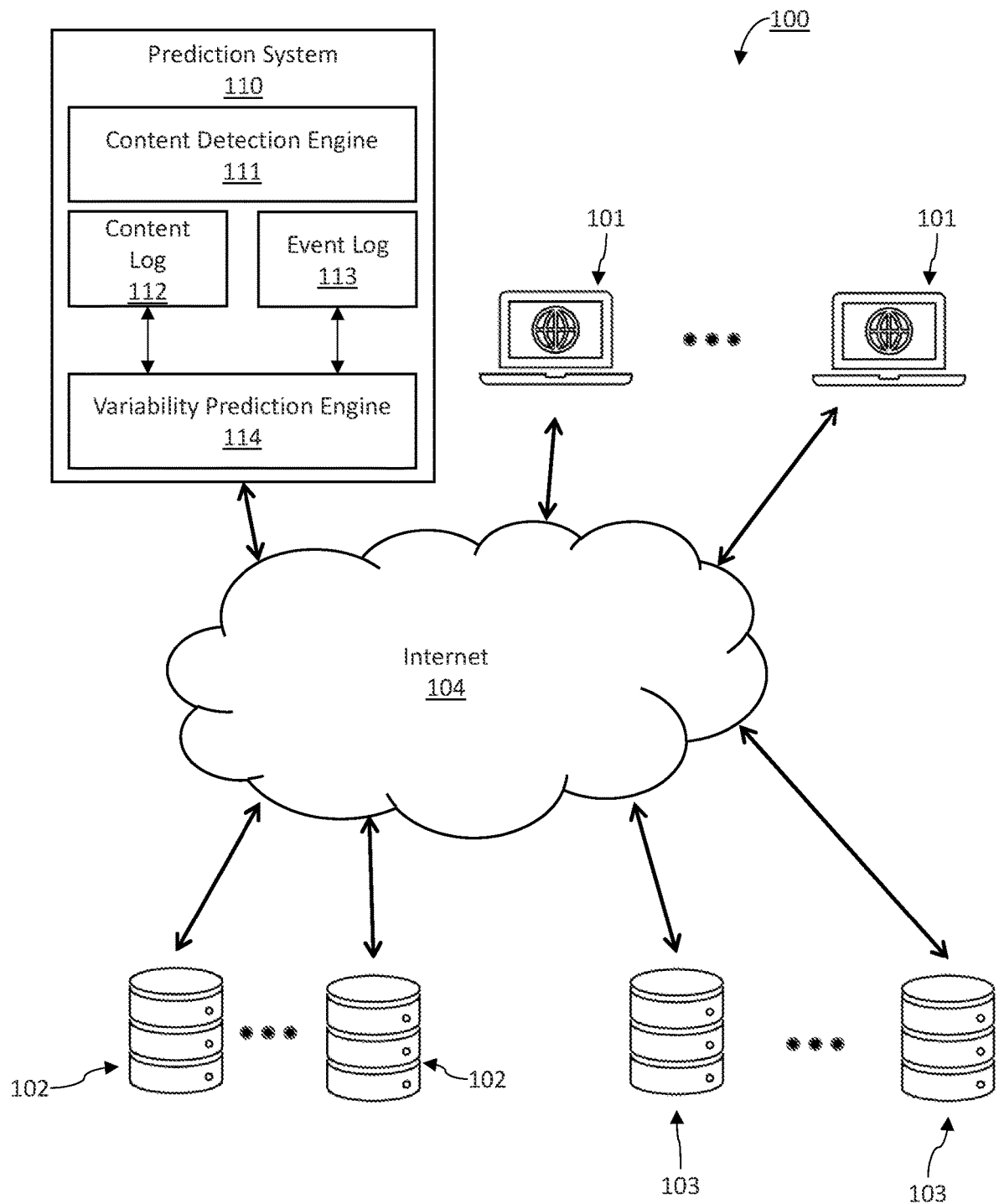
FIGS. 1-9 show one or more schematic flow diagrams, certain computer-based architectures, and/or screenshots of various specialized graphical user interfaces which are illustrative of some exemplary aspects of at least some embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment" and "in some embodiments" as used herein do not necessarily refer to the same embodiment(s), though it may. Furthermore, the phrases "in another embodiment" and "in some other embodiments" as used herein do not necessarily refer to a different embodiment, although it may. Thus, as described below, various embodiments may be readily combined, without departing from the scope or spirit of the present disclosure.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

It is understood that at least one aspect/functionality of various embodiments described herein can be performed in real-time and/or dynamically. As used herein, the term "real-time" is directed to an event/action that can occur instantaneously or almost instantaneously in time when another event/action has occurred. For example, the "real-time processing," "real-time computation," and "real-time execution" all pertain to the performance of a computation during the actual time that the related physical process (e.g., a user interacting with an application on a mobile device) occurs, in order that results of the computation can be used in guiding the physical process.

As used herein, the term "dynamically" and term "automatically," and their logical and/or linguistic relatives and/or derivatives, mean that certain events and/or actions can be triggered and/or occur without any human intervention. In some embodiments, events and/or actions in accordance with the present disclosure can be in real-time and/or based on a predetermined periodicity of at least one of: nanosecond, several nanoseconds, millisecond, several milliseconds, second, several seconds, minute, several minutes, hourly, several hours, daily, several days, weekly, monthly, etc.

As used herein, the term "runtime" corresponds to any behavior that is dynamically determined during an execution of a software application or at least a portion of software application.

In some embodiments, illustrative, specially programmed computing systems with associated devices are configured to operate in the distributed network environment, communicating with one another over one or more suitable data communication networks (e.g., the Internet, satellite, etc.) and utilizing one or more suitable data communication protocols/modes such as, without limitation, IPX/SPX, X.25, AX.25, AppleTalk(™), TCP/IP (e.g., HTTP), near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In some embodiments, the NFC can represent a short-range wireless communications technology in which NFC-enabled devices are "swiped," "bumped," "tap" or otherwise moved in close proximity to communicate. In some embodiments, the NFC could include a set of short-range wireless technologies, typically requiring a distance of 10 cm or less. In some embodiments, the NFC may operate at 13.56 MHz on ISO/IEC 18000-3 air interface and at rates ranging from 106 kbit/s to 424 kbit/s. In some embodiments, the NFC can involve an initiator and a target; the initiator actively generates an RF field that can power a passive target. In some embodiment, this can enable NFC targets to take very simple form factors such as tags, stickers, key fobs, or cards that do not require batteries. In some embodiments, the NFC's peer-to-peer communication can be conducted when a plurality of NFC-enable devices (e.g., smartphones) within close proximity of each other.

The material disclosed herein may be implemented in software or firmware or a combination of them or as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Computer-related systems, computer systems, and systems, as used herein, include any combination of hardware and software. Examples of software may include software components, programs, applications, operating system software, middleware, firmware, software modules, routines, subroutines, functions, methods, procedures, software interfaces, application program interfaces (API), instruction sets, computer code, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that make the logic or processor. Of note, various embodiments described herein may, of course, be implemented using any appropriate hardware and/or computing software languages (e.g., C++, Objective-C, Swift, Java, JavaScript, Python, Perl, QT, etc.).

In some embodiments, one or more of illustrative computer-based systems, illustrative computer-based devices, and/or illustrative computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud servers are examples.

In some embodiments, as detailed herein, one or more of illustrative computer-based systems, illustrative computer-based devices, and/or illustrative computer-based components of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a tweet, a map, an entire application (e.g., a calculator), etc. In some embodiments, as detailed herein, one or more of illustrative computer-based systems, illustrative computer-based devices, and/or illustrative computer-based components of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In some embodiments, illustrative computer-based systems, illustrative computer-based devices, and/or illustrative computer-based components of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various embodiments may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some embodiments, illustrative computer-based systems, illustrative computer-based devices, and/or illustrative computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-999,999,999,999), and so on.

In some embodiments, illustrative computer-based systems, illustrative computer-based devices, and/or illustrative computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some embodiments, illustrative computer-based systems, illustrative computer-based devices, and/or illustrative computer-based components of the present disclosure may be configured to be utilized in various applications which may include, but not limited to, gaming, mobile-device games, video chats, video conferences, live video streaming, video streaming and/or augmented reality applications, mobile-device messenger applications, and others similarly suitable computer-device applications.

As used herein, the term "mobile electronic device," or the like, may refer to any portable electronic device that may or may not be enabled with location tracking functionality (e.g., MAC address, Internet Protocol (IP) address, or the like). For example, a mobile electronic device can include, but is not limited to, a mobile phone, Personal Digital Assistant (PDA), Blackberry™, Pager, Smartphone, or any other reasonable mobile electronic device.

As used herein, terms "proximity detection," "locating," "location data," "location information," and "location tracking" refer to any form of location tracking technology or locating method that can be used to provide a location of, for example, a particular computing device/system of the present disclosure and/or any associated computing devices, based at least in part on one or more of the following techniques/devices, without limitation: accelerometer(s), gyroscope(s), Global Positioning Systems (GPS); GPS accessed using Bluetooth™; GPS accessed using any reasonable form of wireless and/or non-wireless communication; WiFi™ server location data; Bluetooth™ based location data; triangulation such as, but not limited to, network based triangulation, WiFi™ server information based triangulation, Bluetooth™ server information based triangulation; Cell Identification based triangulation, Enhanced Cell Identification based triangulation, Uplink-Time difference of arrival (U-TDOA) based triangulation, Time of arrival (TOA) based triangulation, Angle of arrival (AOA) based triangulation; techniques and systems using a geographic coordinate system such as, but not limited to, longitudinal and latitudinal based, geodesic height based, Cartesian coordinates based; Radio Frequency Identification such as, but not limited to, Long range RFID, Short range RFID; using any form of RFID tag such as, but not limited to active RFID tags, passive RFID tags, battery assisted passive RFID tags; or any other reasonable way to determine location. For ease, at times the above variations are not listed or are only partially listed; this is in no way meant to be a limitation.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In some embodiments, the illustrative computer-based systems, the illustrative computer-based devices, and/or the illustrative computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

The aforementioned examples are, of course, illustrative and not restrictive.

As used herein, the term "user" shall have a meaning of at least one user. In some embodiments, the terms "user", "subscriber" "consumer" or "customer" should be understood to refer to a user of an application or applications as described herein and/or a consumer of data supplied by a data provider. By way of example, and not limitation, the terms "user" or "subscriber" can refer to a person who receives data provided by the data or service provider over the Internet in a browser session, or can refer to an automated software application which receives the data and stores or processes the data.

FIGS. 1 through 9 illustrate systems and methods of variability prediction in data and content across disparate data sources. The following embodiments provide technical solutions and/or technical improvements that overcome technical problems, drawbacks and/or deficiencies in the technical fields involving data aggregation, trend analysis, data correlation, database intercommunication and trend and variability prediction. As explained in more detail, below, technical solutions and/or technical improvements herein include aspects of improved dataset construction through access to external data sources including the incorporation of archival and historical event and externality data, interoperability with third-party archives and databases, and up-to-date recognition of relevance and future variation prediction. Based on such technical features, further technical benefits become available to users and operators of these systems and methods. Moreover, various practical applications of the disclosed technology are also described, which provide further practical benefits to users and operators that are also new and useful improvements in the art.

FIG. 1 is a block diagram of an exemplary computer-based system for data variation prediction in accordance with one or more embodiments of the present disclosure.

In some embodiments, a data variation prediction system 100 includes internet 104 connected devices, such as user computing devices 101, content databases 102 and event information databases 103. In some embodiments, the prediction system 110 may form a prediction for content variability or variation through time according to user input at one or more of the user computing devices 101 to predict, e.g., a future variation and/or a future state of the content. For example, the prediction system 110 may communicate with the user computing devices 101 over a network such as the internet 104. In some embodiments, the network may be, e.g., an intranet, a local area network (LAN), a virtual private network (VPN), a direct connection, a distributed network, or any other wired or wireless connection.

In some embodiments, the user computing devices 101 may send electronic request messages via the internet 104 to the prediction system 110 for a prediction in a future variation of the content being viewed. In some embodiments, the request may originate upon a user selection, such as, e.g., a user selecting a virtual button or other interface object to send the request over the internet 104 to the prediction system 110 for a prediction of a future variation or a future state based on the variation of the content on a screen of the user computing device 101. The selection of the interface object may call, e.g., via an application programming interface (API), a content detection engine 111 of the prediction system 110. In some embodiments, the content detection engine 111 may receive the request and automatically identify the content, including appropriate data items for which to predict future variations and/or states.

In some embodiments, the content is web-based content, such as a website. Accordingly, the content may include hypertext markup language (HTML) structures, HTML, tags, cascading style sheet (CSS) structures, Javascript™ content. In some embodiments, the request includes data associated with the content as represented in a webpage of the website, such as, e.g., HTML tags associated with data and/or text strings encoded in the HTML. The webpage content may be provided as part of the request to the prediction system upon user selection of the interface object, e.g., a button. In some embodiments, the content detection engine 111 may then identify the HTML tags and identify the content that is the subject of the request, e.g., the content of the webpage that the user is viewing on the user computing device 101.

In some embodiments, a software application including the API may automatically identify types of HTML tags of interest according to set of HTML tags upon user selection of the interface object. For example, the API may send with the request an identifier HTML tag and its associated content identification, as well as a state HTML tag and its associated content state. The software application may convey the HTML tags of interest to the content detection engine 111 via the API along with the request. However, in some embodiments, the user selection causes all tags on the webpage being viewed to be conveyed to the content detection engine 111.

However, in some embodiments, the software application may be configured to automatically generate the request via the API to the prediction system 110 upon detection of HTML tags in the set of HTML tags of interest. Thus, in some embodiments, the user computing device 101 may include, e.g., a library of the set of HTML tags of interest. Upon examining a webpage HTML code, the user computing device 101 may compare the tags in the HTML code to the set of HTML tags of interest. Upon finding a match, the user computing device 101 may generate the request with the matching tags and communicate the request to the content detection engine 111.

In some embodiments, the user computing device 101 is configured to send a uniform resource locator (URL) with the request to the prediction system 110, e.g., upon a user navigating to a new webpage. Upon receipt of the URL at the prediction system 110, the content detection engine 111 may analyze the HTML code of the webpage for HTML tags in the set of HTML tags of interest. Thus, in some embodiments, the detection of tags may be performed at the prediction system 110 rather that at the user computing device 101, thus improving the efficiency of the user computing device 101.

In some embodiments, the content may include, e.g., product information such as a price and a product, including an associated price data item and product data item, respectively. For example, the user may be browsing a web-page on the internet 104. The webpage may include a storefront for selling products, with a listing of one or more products and associated prices. Accordingly, in some embodiments, product information such as the product identifier and the product price may be tagged with HTML tags identifying the product identifier and product price accordingly. As a result, in some embodiments, the content detection engine 111 may utilize the tags provided with the request to identify the content including the product associated with the product identifier (e.g., a name, serial number, vendor, manufacturer, or other identifier associated with the HTML tag for the product identifier), and the product price.

In some embodiments, the content detection system 111 may detect content according to string parsing, rather than HTML tag identification. For example, in some embodiments, rather than a set of HTML tags of interest, the content of interest may be identified according to, e.g., a name or other identifier represented as a string and/or number in the HTML code. In some embodiments, the content of interested may be represented by a dictionary of content items of interest. The user computing device 101 and/or the content detection engine 111 may match strings and/or numbers in HTML code of the webpage to entries in the dictionary. In some embodiments, the dictionary includes content information, e.g., a content identifier, associated entities, an associated type, among other related information. The dictionary may be embodied as any suitable data structure, including, e.g., a look-up-table or other table, an array, a list, a file-folder structure, or any other suitable structure. In some embodiments, the dictionary may include the content identifier with an entry for one or more links to the content information maintained elsewhere. In some embodiments, the dictionary is simply a list of content identifiers and associated HTML tags.

For example, where the content of interest is a set of products, the content of interest may be identified by parsing the HTML code of the webpage and extracting product names. The product names may then be compared to the dictionary for product names of interest. The associated price may then be determined using, e.g., a parsing of the content to identify a price indicator using the dictionary, such as, e.g., a currency symbol, the word "price," "MSRP," "Add to Cart," or other indicator of a price associated with the product of interest.

In some embodiments, the content of interest is established by, e.g., an administrator of the prediction system 110, or may be predetermined. In some embodiments, a history of variation and/or state of the content of interest may be collected by the content detection engine 111. For example, in some embodiments, upon a request being received from the user computing device 101, the content detection engine 111 may add the content information, including the content identifier and content state, to the content log along with a date that the request was received and any other suitable information, such as, e.g., entities associated with the content, a content type, among others. In some embodiments, the content identifier, the content state and the date may be added as a content state record in a content log 112 to maintain a history of states of each content identifier of the content of interest. In some embodiments, all records having a common content identifier may be aggregated, linked, or otherwise associated with each other to build a record for the content identifier of the associated content states throughout time.

In some embodiments, the requests from the user computing devices 101 may be supplemented to add more data to the history of each content identifier associated with each content of interest. To facilitate this supplementation, the prediction system 110 may leverage internet archives 102 for historical content state data to add to the content log 112. In some embodiments, the content detection engine 111 may analyze the content archived in each internet archive 102 for the content of interest. For example, in some embodiments, the content detection engine 111 may employ a crawler to examine each webpage in each internet archive 102 for content of interest represented in each webpage's HTML code. For example, as described above, the content crawler may crawl archived webpages searching for HTML tags associated with the set of HTML tags of interest, or for strings including content identifiers of interest according to the dictionary, or by any other suitable method for identifying the content of interest in the internet archives 102.

In some embodiments, each instance of a content of interest may be returned via, e.g., an appropriate API call, to the content detection engine 111 to be added to the content log 112. In some embodiments, the content detection engine 111 may extract from the webpage returned by the crawler the content of interest, including, e.g., the associated content identifier, the associated content attribute, and the associated date of the archived webpage, using, e.g., similar methods to those described above for extract content information. Thus, content records may be added to the content log 112 from the internet archives 102 for a large dataset of historical content variation and/or attribute.

However, limiting the content data to the content itself may fail to account for externalities in content variation through time. Accordingly, in some embodiments, access to additional databases and archives that may contain data regarding events can be leveraged by identifying how the events may influence the variations in the content. However, identifying, communicating with, and accessing data sources having the data regarding the events that impact content variation and attribute is a difficult problem. However, in some embodiments, an event crawler may be employed by the content detection engine 111 to examine each webpage across event databases 103 in communication with the internet 104.

In some embodiments, the event databases 103 may include, e.g., content management systems of news websites, content archives accessible via the internet 104 associated with news publications, internet archive databases such as the internet archives 102, social media posts, blog posts, among other sources and combinations thereof. Thus, similar to the crawler above, the event crawler may crawl internet archives, as well as the internet 104 and websites accessible thereby. In some embodiments, the event crawler may search the event databases 103, e.g., for references to the content of interest in, e.g., each webpage HTML, code associated with each event database 103.

In some embodiments, the dictionary described above further includes related data items to each content of interest, such as, e.g., related entities, related topics, or other related features. In some embodiments, some or all of the related features can be correlated to each content identifier of interest in the dictionary. For example, each content identifier may be associated in the dictionary with one or more related entities and/or one or more related topics. However, some of the related features may be global, such as, e.g., event types (e.g., business/economic news for content of interest including products, political news for content of interest including polling data, sports statistics for content of interest including athlete and/or team performance, or other content of interest). However, in some embodiments, the related event type may not be specified to prevent overfitting by, e.g., the variability prediction engine 114 predictions of variation.

Accordingly, in some embodiments, as described above, the event crawler may crawl archived or live webpages searching for, e.g., strings including content identifiers of interest according to the dictionary, entities associated with the content identifiers of interest according to the dictionary, or other related features and combinations thereof. Accordingly, the event crawler may be configured to parse each webpage to identify words and phrases in the webpage and determine similarity to the event data specified in the dictionary (e.g., using n-gram similarity, or other similarity measure).

In some embodiments, each instance of an event of interest (e.g., an event having content of interest related features as described above) may be returned via, e.g., an appropriate API call, to the content detection engine 111 to be added to the event log 113. In some embodiments, the content detection engine 111 may extract from the webpage returned by the event crawler the event of interest, including, e.g., an event type, a related entity, an event date, and any other data and combinations thereof. In some embodiments, the content detection engine 111 may extract the event information using, e.g., a natural language machine learning model (e.g., a machine learning classifier such a neural network or other classifier), one or more parsing algorithms, or other technique and combination thereof.

For example, in some embodiments, the content detection engine 111 employs an event crawler that implements a term frequency-inverse document frequency (TF-IDF) algorithm to determine relevance of, e.g., articles or other publications describing events, to a content term or topic. In some embodiments, HTML tags are also employed to determine relevance. In some embodiments, the TF-IDF algorithm is modified to weight HTML tags, body text, header text, footer text, or other portions of webpages differently (e.g., a greater weight is assigned to text in a header than in a body based on the HTML tags). In some embodiments, the event crawler implements a term search on webpages based on a content-entity graph such as a graph representing associations between content items or content types and entities (e.g., a product-company graph). Thus, the event crawler may utilize the graph by searching for the content items/topics as well as entities, and the content detection engine 111 may determine an associated between each content and each entity based on the graph. In some embodiments, the event information may then be added to the event log 113 in a structured form (e.g., a table).

In some embodiments, the variability prediction engine 114 utilizes the content log 112 and the event log 113 to train and implement a content prediction machine learning model to predict future content data variations, such as, e.g., a future attribute, value, change in attribute or change in value. In some embodiments, the content prediction machine learning model may include a regression model that is trained to model a correlation between, e.g., date, event type, event entity, event date, content type, among other content and event information.

In some embodiments, a content identifier may be associated with one or more entities. Thus, in some embodiments, the variability prediction engine 114 may aggregate an attribute history associated with the content identifier, e.g., by aggregating each content state with its associated date of access into a history of content attribute. The history of content attribute may then be associated with event information, such as, e.g., event dates and event types, related to each entity associated with the content identifier. Thus, the variability prediction engine 114 may utilize the content prediction machine learning model to correlate the content states and event types related to each content identifier based on date.

In some embodiments, the historical content states in the content log 112 and the historical event types in the event log 113, can form a training dataset where content attribute has known variability relative to related events and date. Thus, the variability prediction engine 114 can use the content log 112 and the event log 113 to train the content prediction engine to correlate a content state with an event type and a date to account for both externalities exerting pressure on content states and seasonalities according to date.

In some embodiments, when a user at a user computing device 101 invokes the prediction system 110 to predict a future state of a content, the content detection engine 111 may receive, e.g., via an API request, content information from the user computing device 101. For example, the user may select a prediction selection in a web-browser (e.g., with a browser extension or add-on) or in an application. The prediction selection may cause the user computing device 101 to send the API request to the prediction system 110, which in turn may cause the content detection engine 111 to extract content information including a content identifier from the content on the user computing device 101 in a manner similar to that described above.

In some embodiments, the content detection engine 111 may extract the content identifier and the content state and pass it to the variability prediction engine 114. In some embodiments, the variability prediction engine 114 may instantiate, e.g., from a memory, the content prediction machine learning model trained as described above, to predict content state of the selected content at a future date based on the events logged in the event log 113, a history of content states of the selected content in the content log 112, the date, or other information and combinations thereof.

In some embodiments, the variability prediction engine 114 may predict the content state at a specified date or range of dates in the future, specified by, e.g., the user at the user computing device 101 as part of the API request. However, the variability prediction engine 114 may additionally, or alternatively, predict a date in the future at which the content state satisfies a particular condition. For example, where the content is a product and the state is price, the variability prediction engine 114 may predict a date or range of dates within the next, e.g., month, 2 months, 3 months, 6 months, 1 year, or other range, at which the price will be lowest based on seasonalities and related events. Moreover, the variability prediction engine 114 may predict a particular state along with the prediction of the date satisfying the condition. In some embodiments, the prediction system 110 may return the prediction to the user computing device 101 as a recommendation.

While the prediction system 110 is described above as being separate from each user computing device 101, in other embodiments, the prediction system 110 or portions thereof, may be located locally at one or more of the user computing device 101.

Figure 2:
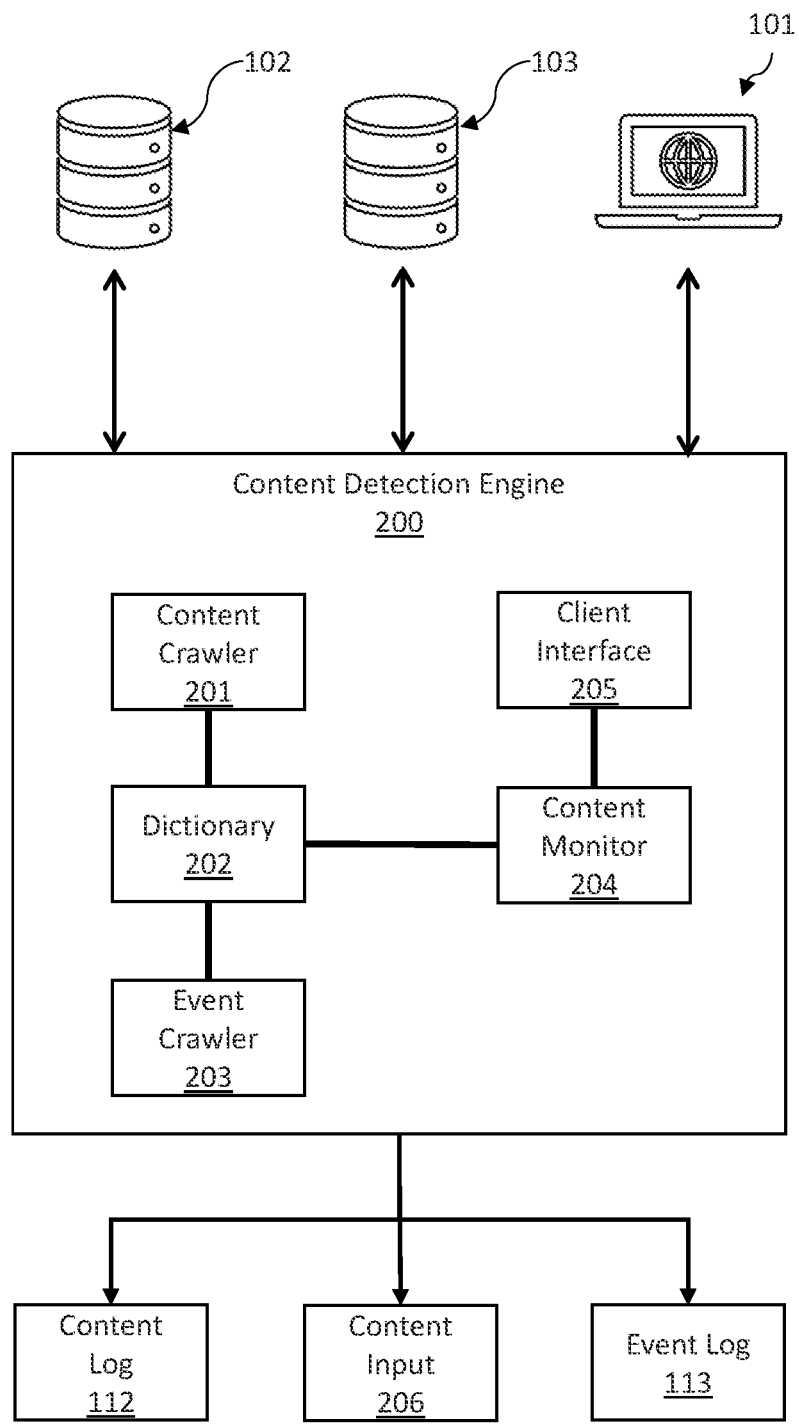

FIG. 2 is a block diagram of another exemplary computer-based system for data variation prediction in accordance with one or more embodiments of the present disclosure.

In some embodiments, a content detection engine 200 may utilize content databases 102, event databases 103 and user computing devices 101 to build a content log 112 logging content of interest and an event log 113 logging content related events. The content detection engine 200 may detect content and events using a content crawler 201 and event crawler 203 based on content of interest defined in a dictionary 202.

In some embodiments, the dictionary 202 may specify content of interest. For example, in some embodiments, the dictionary may content identifiers associated with content of interest, as well as, e.g., related data items to each content of interest, such as related event information, e.g., related entities, related topics, related event types, or other related features.

In some embodiments, some or all of the related features in the dictionary 202 can be correlated to each content identifier of interest in the dictionary. For example, each content identifier may be associated in the dictionary with one or more related entities and/or one or more related topics. However, some of the related features may be global, such as, e.g., event types (e.g., business/economic news for content of interest including products, political news for content of interest including polling data, sports statistics for content of interest including athlete and/or team performance, or other content of interest).

The dictionary 202 may be embodied as any suitable data structure, including, e.g., a look-up-table or other table, an array, a list, a file-folder structure, or any other suitable structure. In some embodiments, the dictionary 202 maintains a list of related features related to the content identifiers in the dictionary. Thus, in some embodiments, the dictionary 202 may include, e.g., a list of HTML tags and character strings related to each item of content information and event information associated with each content identifier for searching for web content related to the content of interest.

In some embodiments, the content crawler 201 accesses the content identifiers of interest in the dictionary 202 to search, e.g., the content databases 102 to identify and return content information stored in the content databases 102 related to each content identifier. In some embodiments, the content detection engine 200 may employ the content crawler 201 to examine each webpage in each, e.g., internet archive 102 for content of interest represented in each webpage HTML code. For example, as described above, the content crawler 201 may crawl archived webpages searching for HTML tags associated with the set of HTML tags of interest, or for strings including content identifiers of interest according to the dictionary, or by any other suitable method for identifying the content of interest in the internet archives 102.

In some embodiments, each instance of a content of interest may be returned via, e.g., an appropriate API call, to the content detection engine 200 to be added to a content log 112. In some embodiments, the content detection engine 200 may extract from the webpage returned by the crawler the content of interest, including, e.g., the associated content identifier, the associated content attribute, and the associated date of the archived webpage, using, e.g., similar methods to those described above for extract content information. Thus, content records may be added to the content log 112 from the internet archives 102 for a large dataset of historical content variation and/or attribute.

Similarly, to account for externalities in variation of content attribute, the event crawler 203 may crawl websites in the event databases 103. For example, in some embodiments, as described above, the event crawler may crawl archived or live webpages searching for, e.g., strings including content identifiers of interest according to the dictionary 202, entities associated with the content identifiers of interest according to the dictionary, or other related features and combinations thereof. Accordingly, the event crawler 203 may be configured to parse each webpage to identify words and phrases in the webpage and determine similarity to the event data specified in the dictionary (e.g., using n-gram similarity, or other similarity measure).

In some embodiments, each instance of an event of interest (e.g., an event having content of interest related features as described above) may be returned via, e.g., an appropriate API call, to the content detection engine 200 to be added to the event log 113. In some embodiments, the content detection engine 200 may extract from the webpage returned by the event crawler the event of interest, including, e.g., an event type, a related entity, an event date, and any other data and combinations thereof. In some embodiments, the content detection engine 200 may extract the event information using, e.g., a natural language machine learning model (e.g., a machine learning classifier such as a neural network or other classifier), one or more parsing algorithms, or other technique and combination thereof. In some embodiments, the event information may then be added to the event log 113 in a structured form (e.g., a table).

Additionally, in some embodiments, the content detection engine 200 may employ a content monitor 204 for real-time detection of content of interest served to a user computing device 101. In some embodiments, the content monitor 204 may monitor a client interface 205 in communication with a client device such as the user computing device 101. In some embodiments, the client interface 205 may include software, such as, e.g., an API that communicates with a content delivery mechanism, such as, e.g., a web-browser (e.g., via the browser directly or via a browser extension), a social media application, or other program or application that provides content to a user, including messaging services, video services, audio content services (e.g., music, podcast, internet radio, radio, audiobook, etc.), news applications and services, RSS feeds, or any other software and combinations thereof.

In some embodiments, the client interface 205 may be configured to detect content of interest at the user computing device 101. For example, upon a content identifier of interest, as listed in the dictionary 202, being served to the user computing device, a browser or browser extension may automatically recognize the content identifier in the HTML, code of the served webpage. The browser extension may examine the HTML code and compare content identifiers with the content identifiers of interest provided by the dictionary 202. Once a match is determined, the browser extension is configured to communicate with the content monitor 204 via the client interface 205 to return the webpage to the content monitor 204. For example, the browser extension may execute an API call that causes the client interface 205 to retrieve the URL of the webpage at the user computing device 101.

In some embodiments, upon receiving the URL with the content of interest being served to the user computing device 101, the content monitor 204 may retrieve the webpage at the URL to examine the HTML code. In some embodiments, similar to the content crawler 201, the content monitor 204 may identify in the webpage content information associated with the identified content of interest (e.g., a content identifier, a content attribute, a webpage date, etc.). In some embodiments, the content monitor 204 may extract the content information and organize it into a content input 206.

In some embodiments, the content input 206 may include, e.g., an array, a table, a list, a tuple, or other data structure specifying the content identifier, a content attribute and a data associated with the detected and identified content of interest by the content monitor 204. The content input 206 may provide a message for, e.g., a variability prediction engine to predict future attributes of the identified content of interest.

Figure 3:
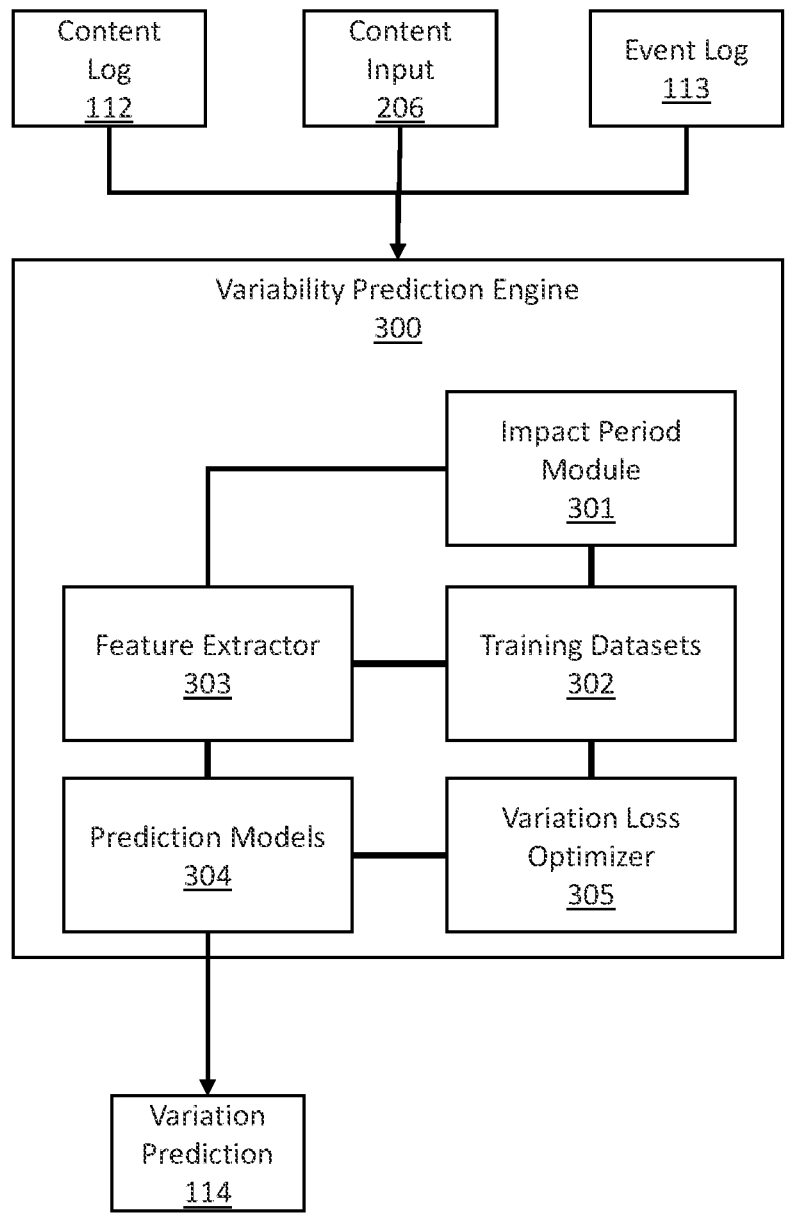

FIG. 3 is a block diagram of another exemplary computer-based system for data variation prediction in accordance with one or more embodiments of the present disclosure.

In some embodiments, a content log 112, an event log 113 and a content input 206 may be provided to a variability prediction engine 300 as input for predicting content attribute variation in the content input 206. The variability prediction engine 300 may, therefore, generate a variation prediction 114 that includes a future attribute prediction associated with the content identifier of the content input 206. In some embodiments, the variation prediction 114 includes a prediction for a predetermined period of time, a prediction for a period of time having a predetermined attribute, or other prediction, and combinations thereof.

In some embodiments, the content input 206 may be received by a feature extractor 303 to extract features associated with the content information of the content input 206. For example, the feature extractor 303 may generate a numerical representation of each of the content identifier, the content attribute and the date specified by the content input 206. In some embodiments, other features may include, e.g., an associated entity, or other suitable features for tracking, e.g., the content attribute through time, taking into account, e.g., seasonal content attribute variation, seasonal or habitual associated entity effects on the content attribute, among other influences in attribute variation through time. In some embodiments, the feature extractor 303 may also extract event features associated with related event information for related events in the event log 113 based on, e.g., related event information established by the dictionary as described above.

In some embodiments, the content features and event features may be communicated from the feature extractor 303 to one or more prediction models 304. In some embodiments, the prediction models 304 are trained machine learning models to, e.g., regressively model content attribute variation and behavior through time.

In some embodiments, the prediction models 304 may be configured to utilize one or more exemplary AI/machine learning techniques chosen from, but not limited to, decision trees, boosting, support-vector machines, neural networks, nearest neighbor algorithms, Naive Bayes, bagging, random forests, and the like. In some embodiments and, optionally, in combination of any embodiment described above or below, an exemplary neutral network technique may be one of, without limitation, feedforward neural network, radial basis function network, recurrent neural network, convolutional network (e.g., U-net) or other suitable network. In some embodiments and, optionally, in combination of any embodiment described above or below, an exemplary implementation of Neural Network may be executed as follows:

i) Define Neural Network architecture/model,
ii) Transfer the input data to the exemplary neural network model,
iii) Train the exemplary model incrementally,
iv) determine the accuracy for a specific number of timesteps,
v) apply the exemplary trained model to process the newly-received input data,
vi) optionally and in parallel, continue to train the exemplary trained model with a predetermined periodicity.

In some embodiments and, optionally, in combination of any embodiment described above or below, the exemplary trained neural network model may specify a neural network by at least a neural network topology, a series of activation functions, and connection weights. For example, the topology of a neural network may include a configuration of nodes of the neural network and connections between such nodes. In some embodiments and, optionally, in combination of any embodiment described above or below, the exemplary trained neural network model may also be specified to include other parameters, including but not limited to, bias values/functions and/or aggregation functions. For example, an activation function of a node may be a step function, sine function, continuous or piecewise linear function, sigmoid function, hyperbolic tangent function, or other type of mathematical function that represents a threshold at which the node is activated. In some embodiments and, optionally, in combination of any embodiment described above or below, the exemplary aggregation function may be a mathematical function that combines (e.g., sum, product, etc.) input signals to the node. In some embodiments and, optionally, in combination of any embodiment described above or below, an output of the exemplary aggregation function may be used as input to the exemplary activation function. In some embodiments and, optionally, in combination of any embodiment described above or below, the bias may be a constant value or function that may be used by the aggregation function and/or the activation function to make the node more or less likely to be activated.

In some embodiments, the prediction models 304 are trained based on training datasets 302 formed by the content log 112 and the event log 113. For example, in some embodiments, an impact period module 301 may pre-processes the content log 112 and the event log 113 to better identify effects on content information by event information. To do so, the impact period module 301 may, e.g., identify by each event in the event log 113, a set of content attributes and dates for each content identifier in the content log 112 that is impacted by the respective event. For example, where an event in the event log 113 includes an associated date, each content information record in the content log 112 can be analyzed to determine whether the associated content identifier has impacted content attributes.

In some embodiments, a content attribute is determined to be impacted by an event where a threshold level change in attribute has occurred within a threshold period of time following the event. For example, where a content attribute including a product price has varied by a threshold level of price change within a threshold time period following, e.g., an event such as a company acquisition, the product price and associated product may be determined to have been impacted by the event.

In some embodiments, the threshold level of attribute change may include, e.g., a suitable threshold level of change to identify an externality in a content of the type in the content log 112 that could be explained by an externality such as the event. For example, for content including product with content attributes including product price, where the product is, e.g., a board game, a change in price by about, e.g., 20%, may indicate an externality, and thus an impact by the event.

In some embodiments, the threshold period of time may be, e.g., a suitable period of time for determining a content of a particular type being impacted by an event of a particular type. In some embodiments, the threshold period of time may include, e.g., about one day, about one week, about two weeks, about one month, about two months, or other suitable time period.

In some embodiments, the threshold level of change and the threshold period of time may be predetermined, and applied by the impact period module 301 using rule-based algorithms. However, in some embodiments, the impact period is a learned function by an impact period machine learning model that is trained to, e.g., classify periods of content attributes associated with each content identifier as impacted or non-impacted by a particular event. For example, the impact period module 301 may, for each content identifier, classify each content attribute and associated date as impacted or non-impacted by a given event using, e.g., a classifier, such as, e.g., a neural network (e.g., a convolutional neural network), decisions trees, random forests, or other classifier. However, in some embodiments, the impact period module 301 is omitted, and training datasets 302 are predetermined using, e.g., human annotation.

In some embodiments, the impact period module 301 may construct one or more training datasets 302 based on the identified impacted attributes associated with an event. Thus, for each event, the impact period module 301 may add the impacted content information to, e.g., an event impacted training dataset, and the non-impacted content information to, e.g., a non-event impacted training dataset. Accordingly, the prediction models 304 may be better trained to correlate events to content attribute variation by avoiding overfitting to ignore event impacted periods of content information due to the nature of content attribute resulting from unpredictable externalities, such as attribute affecting events.

In some embodiments, the prediction models 304 may then be trained using the training datasets. In some embodiments, the prediction models 304 include a model for each training dataset. For example, a non-event impacted model may be trained with the non-event impacted training dataset, while an event impacted model may be trained by the event impacted training dataset. In some embodiments, to take into account long-term effects of an event beyond an initial effect on content information, a third training dataset and third prediction model may be used. In some embodiments, the third dataset may include a post-event impact training dataset including content information from after an event impact period (e.g., content information associated with dates after a last date classified as impacted for an associated content identifier). The third prediction model may be trained with the post-event impact training dataset to produce a post-event impact prediction model. Accordingly, the prediction models 304 may include prediction models for before, during and after an impact period associated with an event.

In some embodiments, the prediction models 304 may receive content features and event features from the feature extractor 303 for each content information record and event information record in each training dataset 302. The prediction models 304 may then predict future content attributes based on the content information and event information. The future content attributes may be provided to a variation loss optimizer 305.

In some embodiments, the variation loss optimizer 305 may compare the predicted attribute for a particular date with an attribute of the associated content identifier in the training datasets 302 for the associated date of the prediction. The variation loss optimizer 305 may then determine a loss for the prediction from each model in the prediction models 304 based on a difference between the predict attribute and actual attribute of the training dataset. Based on the difference, the variation loss optimizer 305 may backpropagate an error associated with the difference to train parameters of each prediction model of the prediction models 304.

In some embodiments, the trained prediction models 304 may predict a future attribute for the content input 206. In some embodiments, the prediction models 304 may, based on the event lot 113, determine a prediction model of the prediction models to implement. For example, where the impact period module 301 identifies a related event to the content of the content input 206, the impact period module 301 may classify the date of the content information for the content input 206 as, e.g., pre-event impacted, event impacted, and post-event impacted, or other classification as described above. Based on the classification and the content features and event features extracted by the feature extractor 303, a prediction model of the prediction models 304 may be selected and utilized to generation the variation prediction 114.

In some embodiments, the variation prediction 114 may include three separate predictions, each associated with a respective one of the prediction models 304. In such a case, the variation prediction 114 including a prediction by each of the three models may be accompanied by data indicating whether the prediction takes an event into account. Thus, the variation prediction 114 may be returned to a user with three predictions for variation in content, as well as a notification of whether each of the three predictions takes an event into account.

In some embodiments, error in each prediction model of the prediction models 304 may be tracked through time. At each use of the prediction models 304, the lowest error model may be utilized to generate the variation prediction 114 to be returned to the user. In some embodiments, where one or more of the prediction models 304 exhibits a lowest accuracy over a period of time (e.g., about 1 month, about 2 months, about 3 months, about 6 months, about 1 year, etc.), the lowest accuracy prediction model may be removed entirely from the prediction models 304 to generate variation predictions 114 using one or more of the remaining prediction models.

In some embodiments, the prediction models 304 may be trained in an online fashion, where the variation prediction 114 for a content input 206 is recorded by the variation loss optimizer 305. Once an updated content log 112 is received having content information including a content attribute for the date of the content identifier of the content input 206, the variation prediction 114 and the content attribute from the updated content log 112 may be compared to determine an error. As described above, the error may then be backpropagated to the prediction models 304 to update one or more prediction models based on the error.

Figure 4:
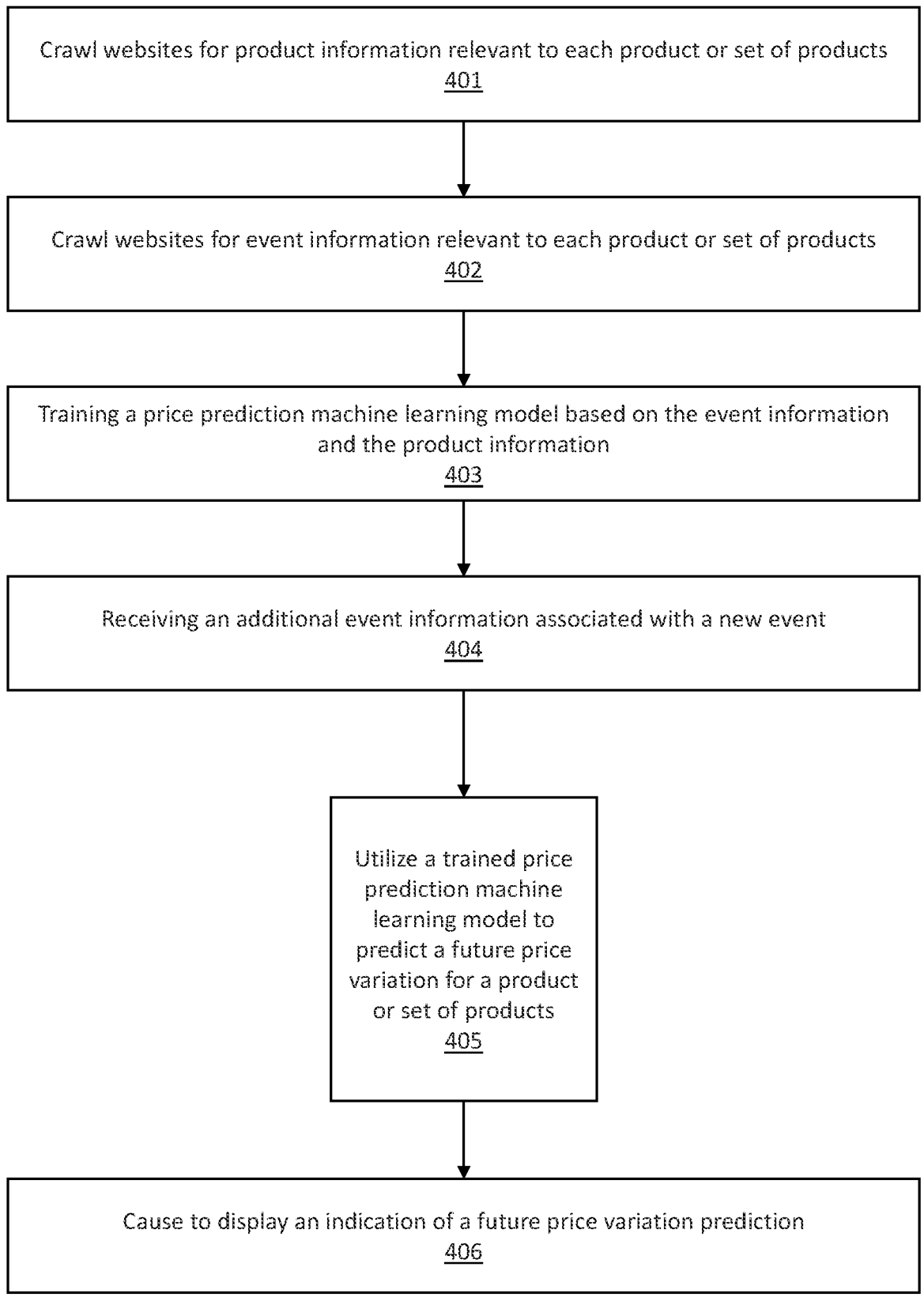

FIG. 4 illustrates a flowchart of an illustrative methodology for data variation prediction in accordance with one or more embodiments of the present disclosure.

In some embodiments, the content includes products, and the content information includes product names, product price and a date of the price. In such embodiments, at block 401 websites are crawled for product information relevant to each product or set of products to collect product information for a plurality of products from electronic archived web sites record databases. In some embodiments, the product information for each product includes prices and a date associated with each price.

In such embodiments, at block 402, websites are crawled for event information relevant to each product or set of products to collect historical event information from online sources. In some embodiments, the historical event information is associated with historical events and the historical event information includes a date associated with each historical event.

In such embodiments, at block 403, a price prediction machine learning model is trained based at least in part on event-dependent products training datasets to generate a trained price prediction machine learning model. In some embodiments, the event-dependent products training dataset defines for each product at least one event of the historical events that is associated with prices of the product, price changes of the product, or combinations thereof.

In such embodiments, at block 404, additional event information is collected from the online sources. In some embodiments, the additional event information is associated with additional events, and includes a date associated with each event.

In such embodiments, at block 405, the trained price prediction machine learning model is applied to the additional event information for the product or set of products to predict a future price estimate, a future price change estimate, or a combination thereof.

In such embodiments, at block 406, an indication of a future price variation prediction is displayed on a screen of a user computing device. In some embodiments, the indication includes an indication representative of the future price estimate, the future price change estimate, or a combination thereof.

Figure 5:
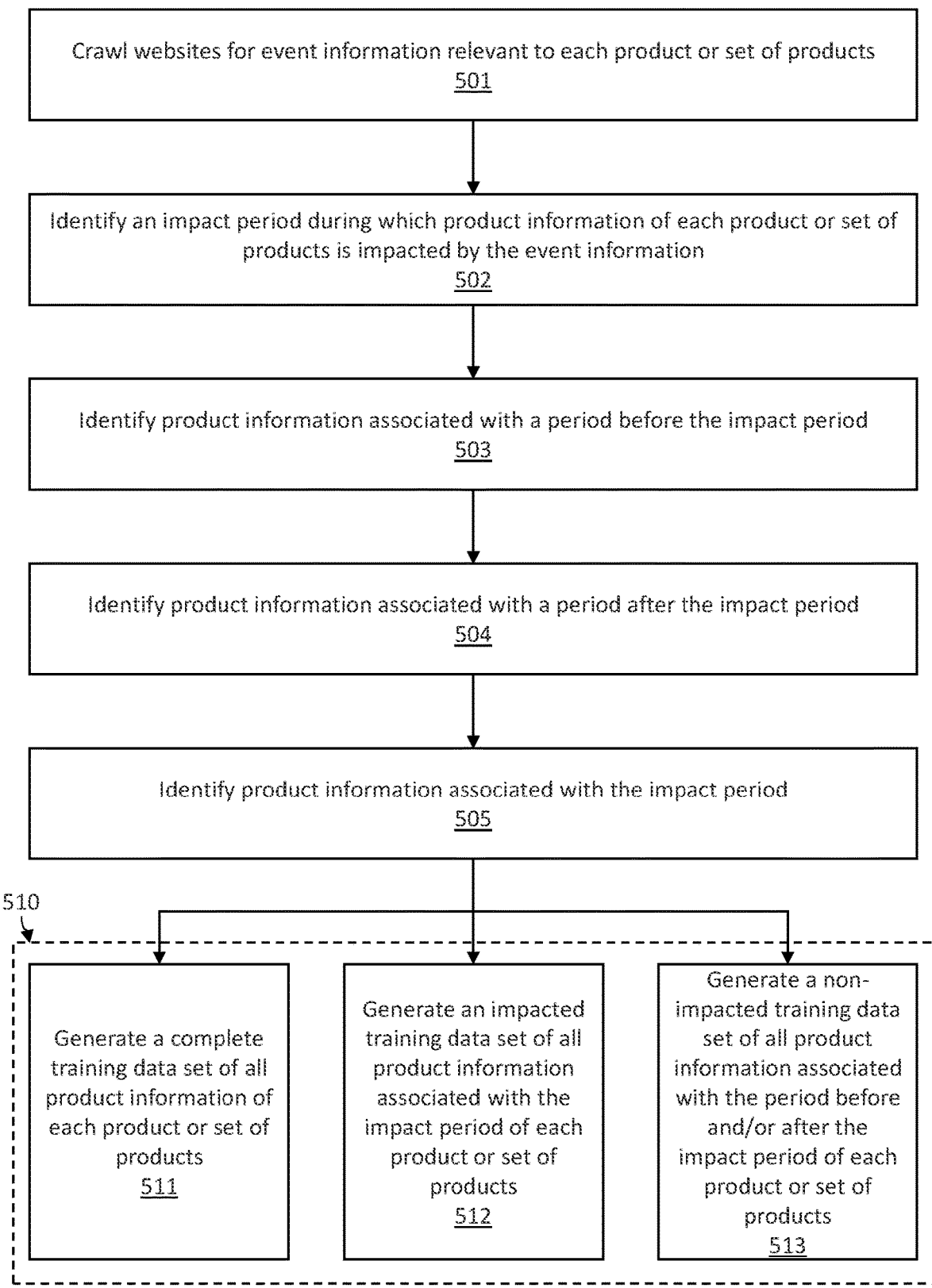

FIG. 5 illustrates a flowchart of an illustrative methodology for training prediction models for data variation prediction in accordance with one or more embodiments of the present disclosure.

In some embodiments, the content includes products, and the content information includes product names, product price and a date of the price. In such embodiments, at block 501, a crawler may crawl websites for event information relevant to each product or set of products. The event information may be logged in an event log and tagged or otherwise identified as related to the product or set of products.

In some embodiments, at block 502, an impact period may be identified during which product information of each product or set of products is impacted by the event information. As described above, the impact period may be, e.g., human annotated, classified using a machine learning classifier, or determined based on a threshold change in product price for dates following the event.

In some embodiments, at block 503, the product information associated with a period before the impact period may be identified according to the classification of the impact period.

Similarly, in some embodiments, at block 504 product information associated with a period after the impact period is identified.

In some embodiments, at block 505 product information associated with the impact period is also identified.

In some embodiments, at block 510 training datasets are generated based on whether product information is associated with before, during or after the impact period. In some embodiments, the training dataset can include blocks 511 through 513 to incorporate event information for training the price predictions.

In some embodiments, at block 511 a complete training data set of all product information of each product or set of products is generated including the product information for each product or set of products associated with before, during and after the impact period.

In some embodiments, at block 512 an impacted training data set of all product information associated with the impact period of each product or set of products is generated, and at block 513 a non-impacted training data set of all product information associated with the period before and/or after the impact period of each product or set of products is generated.

Thus, in some embodiments, three training datasets are generated to train three associated product price prediction models to predict product price variation while incorporating the impact of external events on product pricing.

Figure 6:
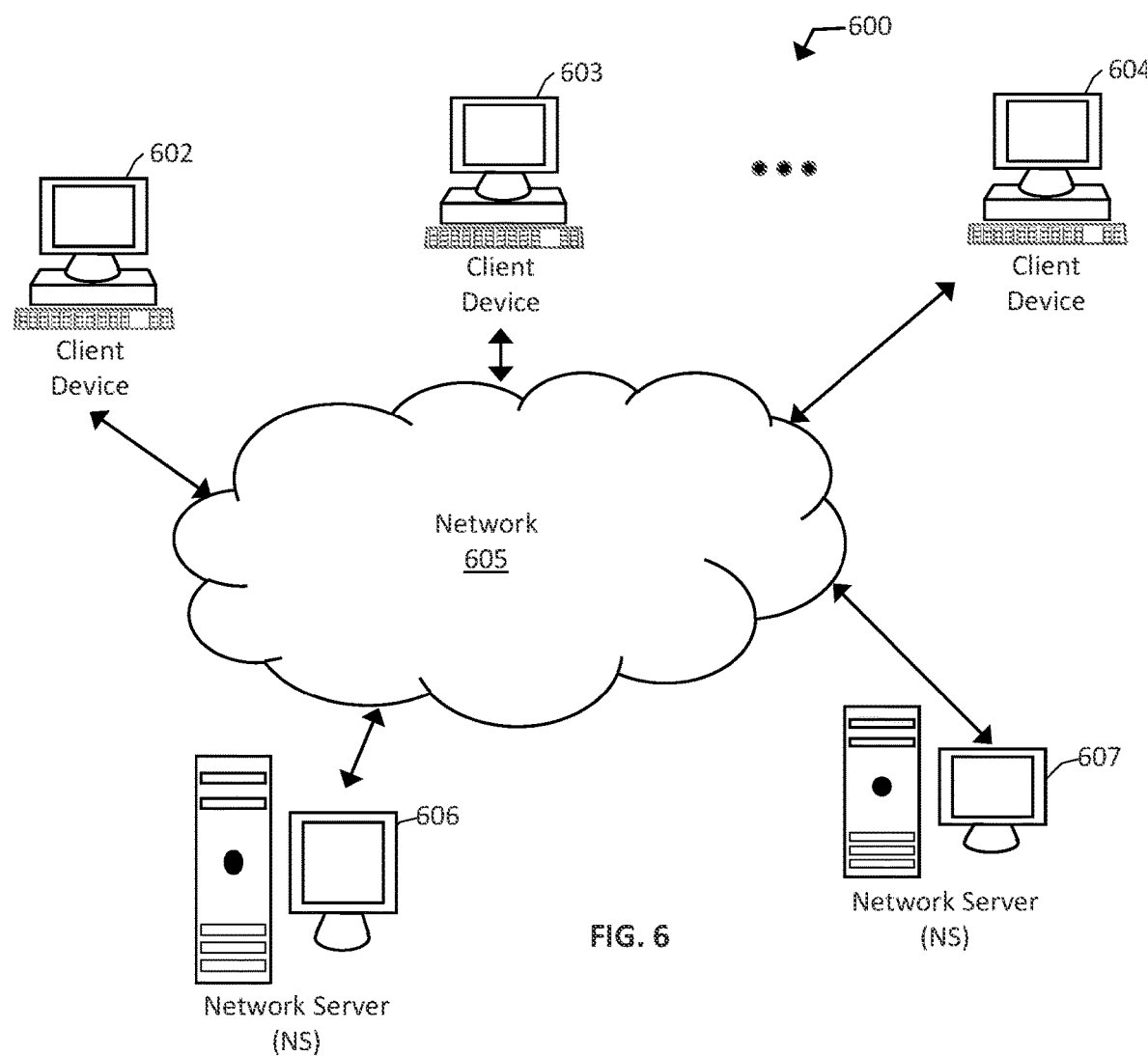

FIG. 6 depicts a block diagram of an exemplary computer-based system 600 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the illustrative computing devices and/or the illustrative computing components of the exemplary computer-based system 600 may be configured to manage a large number of members and/or concurrent transactions, as detailed herein. In some embodiments, the exemplary computer-based system 600 may be based on a scalable computer and/or network architecture that incorporates varies strategies for assessing the data, caching, searching, and/or database connection pooling. An example of the scalable architecture is an architecture that is capable of operating multiple servers.

In some embodiments, referring to FIG. 6, members 602-604 (e.g., clients) of the exemplary computer-based system 600 may include virtually any computing device capable of receiving and sending a message over a network (e.g., cloud network), such as network 605, to and from another computing device, such as servers 606 and 607, each other, and the like. In some embodiments, the member devices 602-604 may be personal computers, multiprocessor systems, microprocessor-based or programmable consumer electronics, network PCs, and the like. In some embodiments, one or more member devices within member devices 602-604 may include computing devices that typically connect using a wireless communications medium such as cell phones, smart phones, pagers, walkie talkies, radio frequency (RF) devices, infrared (IR) devices, CBs, integrated devices combining one or more of the preceding devices, or virtually any mobile computing device, and the like. In some embodiments, one or more member devices within member devices 602-604 may be devices that are capable of connecting using a wired or wireless communication medium such as a PDA, POCKET PC, wearable computer, a laptop, tablet, desktop computer, a netbook, a video game device, a pager, a smart phone, an ultra-mobile personal computer (UMPC), and/or any other device that is equipped to communicate over a wired and/or wireless communication medium (e.g., NFC, RFID, NBIOT, 3G, 4G, 6G, GSM, GPRS, WiFi, WiMax, CDMA, satellite, ZigBee, etc.). In some embodiments, one or more member devices within member devices 602-604 may include may run one or more applications, such as Internet browsers, mobile applications, voice calls, video games, videoconferencing, and email, among others. In some embodiments, one or more member devices within member devices 602-604 may be configured to receive and to send web pages, and the like. In some embodiments, an exemplary specifically programmed browser application of the present disclosure may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In some embodiments, a member device within member devices 602-604 may be specifically programmed by either Java, .Net, QT, C, C++ and/or other suitable programming language. In some embodiments, one or more member devices within member devices 602-604 may be specifically programmed include or execute an application to perform a variety of possible tasks, such as, without limitation, messaging functionality, browsing, searching, playing, streaming or displaying various forms of content, including locally stored or uploaded messages, images and/or video, and/or games.

In some embodiments, the exemplary network 605 may provide network access, data transport and/or other services to any computing device coupled to it. In some embodiments, the exemplary network 605 may include and implement at least one specialized network architecture that may be based at least in part on one or more standards set by, for example, without limitation, Global System for Mobile communication (GSM) Association, the Internet Engineering Task Force (IETF), and the Worldwide Interoperability for Microwave Access (WiMAX) forum. In some embodiments, the exemplary network 605 may implement one or more of a GSM architecture, a General Packet Radio Service (GPRS) architecture, a Universal Mobile Telecommunications System (UMTS) architecture, and an evolution of UMTS referred to as Long Term Evolution (LTE). In some embodiments, the exemplary network 605 may include and implement, as an alternative or in conjunction with one or more of the above, a WiMAX architecture defined by the WiMAX forum. In some embodiments and, optionally, in combination of any embodiment described above or below, the exemplary network 605 may also include, for instance, at least one of a local area network (LAN), a wide area network (WAN), the Internet, a virtual LAN (VLAN), an enterprise LAN, a layer 3 virtual private network (VPN), an enterprise IP network, or any combination thereof. In some embodiments and, optionally, in combination of any embodiment described above or below, at least one computer network communication over the exemplary network 605 may be transmitted based at least in part on one of more communication modes such as but not limited to: NFC, RFID, Narrow Band Internet of Things (NBIOT), ZigBee, 3G, 4G, 6G, GSM, GPRS, WiFi, WiMax, CDMA, satellite and any combination thereof. In some embodiments, the exemplary network 605 may also include mass storage, such as network attached storage (NAS), a storage area network (SAN), a content delivery network (CDN) or other forms of computer or machine readable media.

In some embodiments, the exemplary server 606 or the exemplary server 607 may be a web server (or a series of servers) running a network operating system, examples of which may include but are not limited to Microsoft Windows Server, Novell NetWare, or Linux. In some embodiments, the exemplary server 606 or the exemplary server 607 may be used for and/or provide cloud and/or network computing. Although not shown in FIG. 6, in some embodiments, the exemplary server 606 or the exemplary server 607 may have connections to external systems like email, SMS messaging, text messaging, ad content providers, etc. Any of the features of the exemplary server 606 may be also implemented in the exemplary server 607 and vice versa.

In some embodiments, one or more of the exemplary servers 606 and 607 may be specifically programmed to perform, in non-limiting example, as authentication servers, search servers, email servers, social networking services servers, SMS servers, IM servers, MMS servers, exchange servers, photo-sharing services servers, advertisement providing servers, financial/banking-related services servers, travel services servers, or any similarly suitable service-base servers for users of the member computing devices 601-604.

In some embodiments and, optionally, in combination of any embodiment described above or below, for example, one or more exemplary computing member devices 602-604, the exemplary server 606, and/or the exemplary server 607 may include a specifically programmed software module that may be configured to send, process, and receive information using a scripting language, a remote procedure call, an email, a tweet, Short Message Service (SMS), Multimedia Message Service (MMS), instant messaging (IM), internet relay chat (IRC), mIRC, Jabber, an application programming interface, Simple Object Access Protocol (SOAP) methods, Common Object Request Broker Architecture (CORBA), HTTP (Hypertext Transfer Protocol), REST (Representational State Transfer), or any combination thereof.

Figure 7:
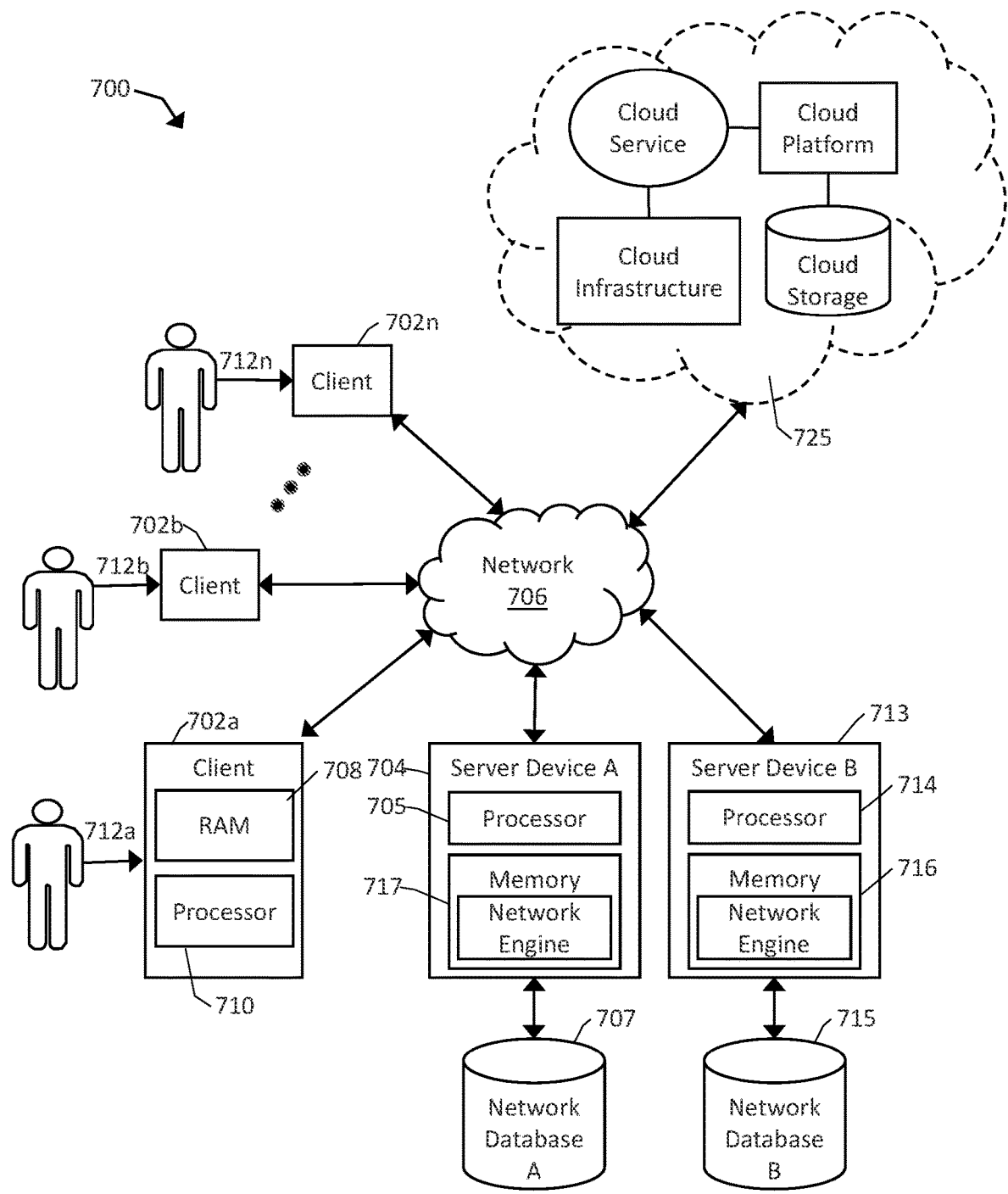

FIG. 7 depicts a block diagram of another exemplary computer-based system 700 in accordance with one or more embodiments of the present disclosure. However, not all of these components may be required to practice one or more embodiments, and variations in the arrangement and type of the components may be made without departing from the spirit or scope of various embodiments of the present disclosure. In some embodiments, the member computing devices 702a, 702b thru 702n shown each at least includes a computer-readable medium, such as a random-access memory (RAM) 708 coupled to a processor 710 or FLASH memory. In some embodiments, the processor 710 may execute computer-executable program instructions stored in memory 708. In some embodiments, the processor 710 may include a microprocessor, an ASIC, and/or a state machine. In some embodiments, the processor 710 may include, or may be in communication with, media, for example computer-readable media, which stores instructions that, when executed by the processor 710, may cause the processor 710 to perform one or more steps described herein. In some embodiments, examples of computer-readable media may include, but are not limited to, an electronic, optical, magnetic, or other storage or transmission device capable of providing a processor, such as the processor 710 of client 702a, with computer-readable instructions. In some embodiments, other examples of suitable media may include, but are not limited to, a floppy disk, CD-ROM, DVD, magnetic disk, memory chip, ROM, RAM, an ASIC, a configured processor, all optical media, all magnetic tape or other magnetic media, or any other medium from which a computer processor can read instructions. Also, various other forms of computer-readable media may transmit or carry instructions to a computer, including a router, private or public network, or other transmission device or channel, both wired and wireless. In some embodiments, the instructions may comprise code from any computer-programming language, including, for example, C, C++, Visual Basic, Java, Python, Perl, JavaScript, and etc.

In some embodiments, member computing devices 702a through 702n may also comprise a number of external or internal devices such as a mouse, a CD-ROM, DVD, a physical or virtual keyboard, a display, or other input or output devices. In some embodiments, examples of member computing devices 702a through 702n (e.g., clients) may be any type of processor-based platforms that are connected to a network 706 such as, without limitation, personal computers, digital assistants, personal digital assistants, smart phones, pagers, digital tablets, laptop computers, Internet appliances, and other processor-based devices. In some embodiments, member computing devices 702a through 702n may be specifically programmed with one or more application programs in accordance with one or more principles/methodologies detailed herein. In some embodiments, member computing devices 702a through 702n may operate on any operating system capable of supporting a browser or browser-enabled application, such as Microsoft™, Windows™, and/or Linux. In some embodiments, member computing devices 702a through 702n shown may include, for example, personal computers executing a browser application program such as Microsoft Corporation's Internet Explorer™, Apple Computer, Inc.'s Safari™, Mozilla Firefox, and/or Opera. In some embodiments, through the member computing client devices 702a through 702n, users, 712a through 702n, may communicate over the exemplary network 706 with each other and/or with other systems and/or devices coupled to the network 706. As shown in FIG. 7, exemplary server devices 704 and 713 may be also coupled to the network 706. In some embodiments, one or more member computing devices 702a through 702n may be mobile clients.

In some embodiments, at least one database of exemplary databases 707 and 715 may be any type of database, including a database managed by a database management system (DBMS). In some embodiments, an exemplary DBMS-managed database may be specifically programmed as an engine that controls organization, storage, management, and/or retrieval of data in the respective database. In some embodiments, the exemplary DBMS-managed database may be specifically programmed to provide the ability to query, backup and replicate, enforce rules, provide security, compute, perform change and access logging, and/or automate optimization. In some embodiments, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some embodiments, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some embodiments, the exemplary DBMS-managed database may be specifically programmed to include metadata about the data that is stored.

Figure 8:
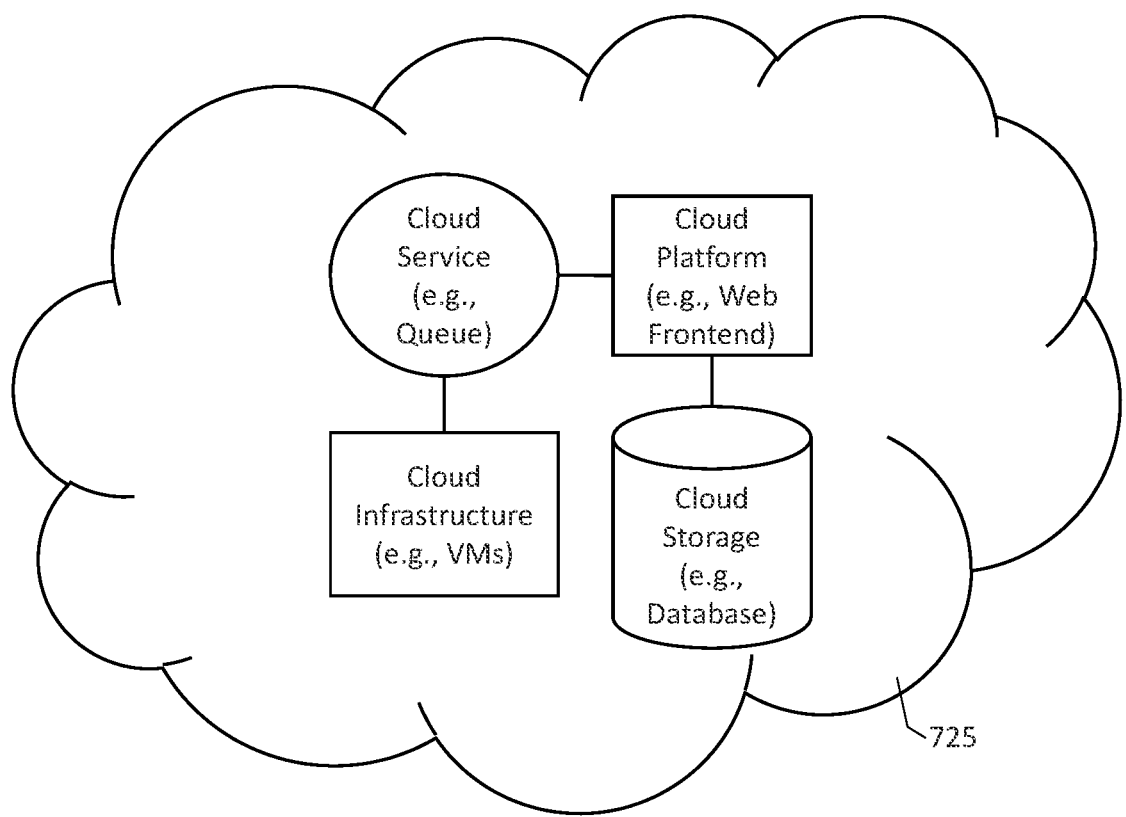
Figure 9:
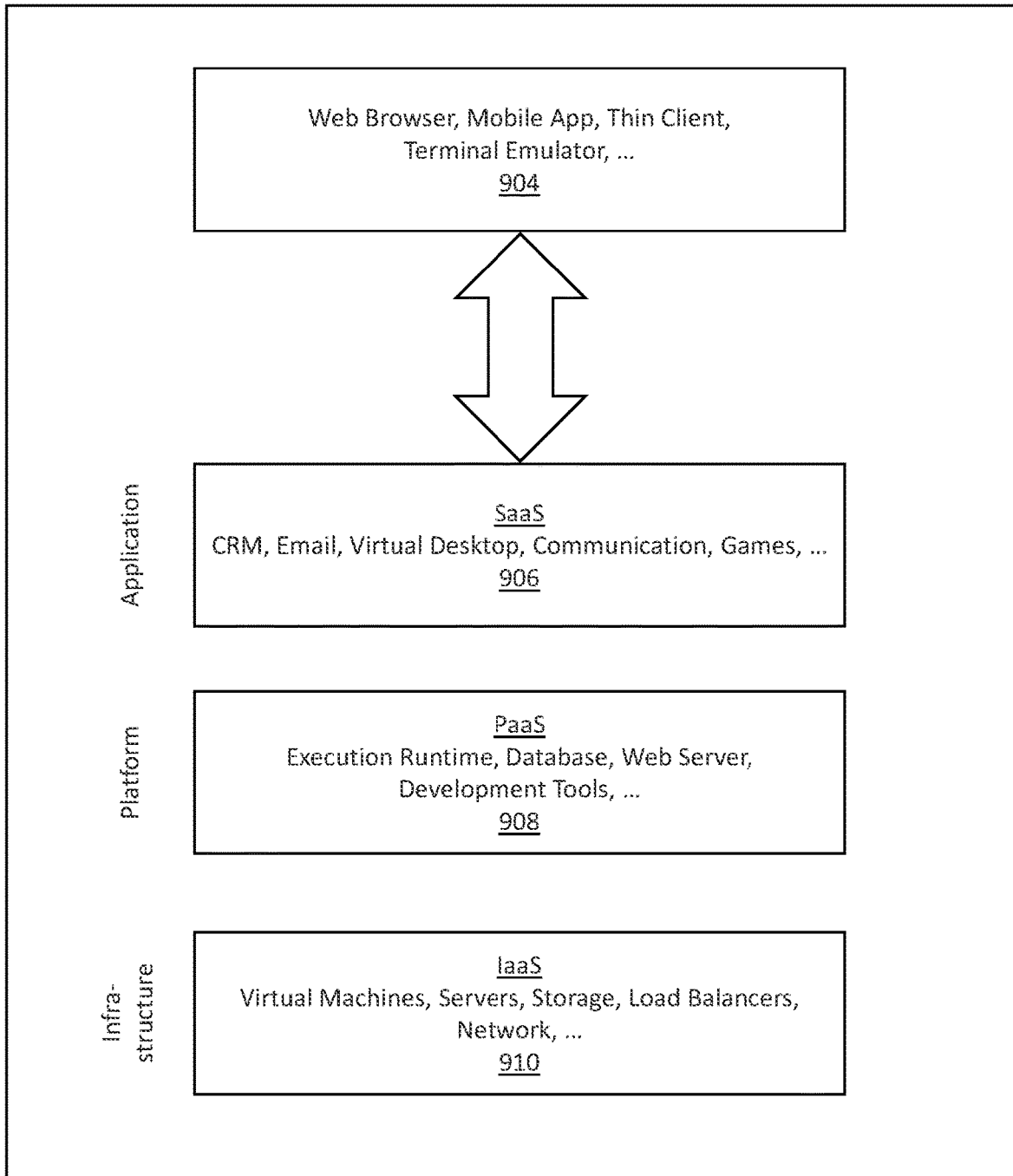

In some embodiments, the illustrative computer-based systems, the illustrative computer-based devices, and/or the illustrative computer-based components of the present disclosure may be specifically configured to operate in a cloud computing/architecture such as, but not limiting to: infrastructure a service (IaaS), platform as a service (PaaS), and/or software as a service (SaaS). FIGS. 8 and 9 illustrate schematics of exemplary implementations of the cloud computing/architecture(s) in which the illustrative computer-based systems, the illustrative computer-based devices, and/or the illustrative computer-based components of the present disclosure may be specifically configured to operate.

At least some aspects of the present disclosure will now be described with reference to the following numbered clauses.

1. A method, comprising:
    collecting, by at least one processor, product information for a plurality of products from one or more electronic archived websites record databases;
        wherein the product information for each product of the plurality of products comprises:
            i) one or more attributes, and
            ii) a date associated with each attribute of the one or more attributes;
    collecting, by the at least one processor, historical event information from one or more online sources;
        wherein the historical event information is associated with a plurality of historical events;
        wherein the historical event information comprises a date associated with each event of the plurality of historical events;
    generating, by the at least one processor, at least one event-dependent products training dataset based at least in part on the product information and the historical event information;
        wherein the at least one event-dependent products training dataset defines for at least one product of the plurality of products at least one event of the plurality of historical events that is associated with:
            (a) at least one attribute of the one or more attributes of the at least one product,
            (b) at least one attribute change of the at least one product, or
            (c) both (a) and (b);
    training, by the at least one processor, an attribute prediction machine learning model based at least in part on the at least one event-dependent products training dataset to generate a trained attribute prediction machine learning model;
    collecting, by the at least one processor, additional event information from the one or more online sources;
        wherein the additional event information is associated with one or more additional events;
        wherein the additional event information comprises a date associated with each event of the one or more additional events;
    applying, by the at least one processor, the trained attribute prediction machine learning model to the additional event information to predict, for at least one product of the plurality of products, (a) a future attribute estimate, (b) a future attribute change estimate, or (c) both (a) and (b); and
    causing to display, by the at least one processor, at least one indication representative of (a) the future attribute estimate, (b) the future attribute change estimate, or (c) both (a) and (b), on a screen of at least one computing device.

2. The method of clause 1, further comprising:
    determining, by the at least one processor, a respective attribute impact period of one or more attribute impact periods associated with each respective additional event based on a respective variation in a respective one or more attribute of each product following the respective additional event information;
        wherein the attribute impact period comprises a set of dates for which the additional event information is correlated with each respective variation; and
    determining, by the at least one processor, an impacted product dataset comprising each respective product of the plurality of products associated with each respective variation in the respective one or more attribute.

3. The method of clause 2, further comprising:
    generating, by the at least one processor, a first training dataset comprising at least one subset of selected products;
    generating, by the at least one processor, a second training dataset comprising the impacted product dataset; and
    generating, by the at least one processor, a third training dataset comprising post-impact product information;
        wherein the post-impact product information comprises respective product information of respective selected products of the subset of selected products having a respective date after each respective attribute impact period; and
        wherein training the at least one attribute prediction machine learning model comprises training a first attribute prediction machine learning model with the first training dataset, a second attribute prediction machine learning model with the second training dataset, and a third attribute prediction machine learning model with the third training dataset.

4. The method of clause 2, further comprising:
    determining, by the at least one processor, that at least one attribute impact period of one or more attribute impact periods has not ended;
    generating, by the at least one processor, a first training dataset comprising at least one subset of selected products;
    generating, by the at least one processor, a second training dataset comprising non-impacted product information;
        wherein the non-impacted product information comprises respective product information of respective selected products of the subset of selected products having a respective attribute-posted date not during the at least one attribute impact period; and
        wherein training the at least one attribute prediction machine learning model comprises training a first attribute prediction machine learning model with the first training dataset, and a second attribute prediction machine learning model with the second training dataset.

5. The method of clause 1, further comprising receiving, by the at least one processor, a prediction request from the at least one computing device associated with the user; and
    wherein the prediction request comprising the at least one particular product.

6. The method of clause 5, wherein the prediction request is generated by a user selection using an attribute prediction graphical user interface at the at least one computing device associated with the user.

7. The method of clause 1, wherein the product information further comprises a product category associated with each of the plurality of products.

8. The method of clause 7, further comprising:
   causing, by the at least one processor, to display a product research graphical user interface (GUI) on a screen of the at least one computing device;
   wherein the product research GUI is configured to allow the at least one user to define a category view for at least one of the product category associated with each of the plurality of products; and wherein the category view presents a purchase recommendation based on the at least one
   predicted future attribute, at least one predicted future attribute change, or both, for each of the plurality of products of each product category.

9. The method of clause 1, further comprising:
   detecting, by the at least one processor, a viewed product information displayed on a screen of the at least one computing device associated with the user;
   receiving, by the at least one processor via an application programming interface (API), an automatic attribute prediction request for the viewed product information;
   determining, by the at least one processor, the at least one particular product based on the viewed product information;
   determining, by the at least one processor, a cheapest date prediction based on the at least one particular product; and
      wherein the cheapest date prediction is based on the at least one predicted future attribute, at least one predicted future attribute change, or both predicted by the at least one attribute prediction machine learning model for the at least one particular product.

10. The method of clause 9, wherein the cheapest date prediction comprises a date within one year into the future.

11. A method, comprising:
   collecting, by at least one processor, product information for a plurality of products from one or more electronic archived websites record databases;
      wherein the product information for each product of the plurality of products comprises:
         i) one or more attributes, and
         ii) a date associated with each attribute of the one or more attributes; collecting, the at least one processor, event information from the plurality of online sources;
      wherein the event information is associated with a plurality of events;
      wherein the event information comprises at least one respective date of each respective event;
   applying, by the at least one processor, at least one trained attribute prediction machine learning model to the product information and the event information to predict, for at least one product of the plurality of products, (a) a future attribute estimate, (b) a future attribute change estimate, or (c) both (a) and (b);
      wherein an attribute prediction machine learning model is trained based at least in part on at least one event-dependent products training dataset to generate the at least one trained attribute prediction machine learning model;
      wherein the at least one event-dependent products training dataset comprises at least one subset of selected products of the plurality of products
      wherein the at least one event-dependent products training dataset defines for each respective selected product of the at least one subset of selected products:
         i) at least one attribute-related historical event that is associated with at least one attribute of a respective selected product, at least one attribute change of the respective selected product, or both, and
         ii) at least one attribute impact period associated with the at least one attribute-related historical event;
            wherein the at least one attribute impact period identifies a respective time period over which the at least one attribute change associated with the at least one attribute-related historical event has occurred;
   causing to display, by the at least one processor, at least one indication representative of the at least one predicted future attribute, at least one predicted future attribute change, or both, on a screen of at least one computing device associated with the user.

12. The method of clause 11, wherein the at least one trained attribute prediction machine learning model comprises:
   a first trained attribute prediction machine learning model trained using a first training dataset comprising the at least one subset of selected products;
   a second trained attribute prediction machine learning model trained using a second training dataset comprising impacted product information;
      wherein the impacted product information comprises respective product information of respective selected products of the subset of selected products having a respective date during the at least one attribute impact period; and
   a third trained attribute prediction machine learning model trained using a third training dataset comprising post-impact product information;
      wherein the post-impact product information comprises respective product information of respective selected products of the subset of selected products having a respective date after the at least one attribute impact period.

13. The method of clause 11, wherein the at least one trained attribute prediction machine learning model comprises:
   a first trained attribute prediction machine learning model trained using a first training dataset comprising the at least one subset of selected products; and
   a second trained attribute prediction machine learning model trained using a second training dataset comprising non-impacted product information;
      wherein the non-impacted product information comprises respective product information of respective selected products of the subset of selected products having a respective attribute-posted date not during the at least one attribute impact period.

14. The method of clause 11, further comprising receiving, by the at least one processor, a prediction request from the at least one computing device associated with the user; and
   wherein the prediction request comprising the at least one particular product.

15. The method of clause 14, wherein the prediction request is generated by a user selection using an attribute prediction graphical user interface at the at least one computing device associated with the user.

16. The method of clause 11, wherein the product information further comprises a product category associated with each of the plurality of products.

17. The method of clause 16, further comprising:
causing, by the at least one processor, to display a product research graphical user interface (GUI) on a screen of the at least one computing device;
wherein the product research GUI is configured to allow the at least one user to define a category view for at least one of the product category associated with each of the plurality of products; and
wherein the category view presents a purchase recommendation based on the at least one predicted future attribute, at least one predicted future attribute change, or both, for each of the plurality of products of each product category.

18. The method of clause 17, further comprising:
detecting, by the at least one processor, a viewed product information displayed on a screen of the at least one computing device associated with the user;
receiving, by the at least one processor via an application programming interface (API), an automatic attribute prediction request for the viewed product information;
determining, by the at least one processor, the at least one particular product based on the viewed product information;
determining, by the at least one processor, a cheapest date prediction based on the at least one particular product; and
wherein the cheapest date prediction is based on the at least one predicted future attribute, at least one predicted future attribute change, or both predicted by the at least one attribute prediction machine learning model for the at least one particular product.

19. The method of clause 18, wherein the cheapest date prediction comprises a date within one year into the future.

20. A system, comprising:
at least one processor configured to:
collect product information for a plurality of products from one or more electronic archived websites record databases;
wherein the product information for each product of the plurality of products comprises:
i) one or more attributes, and
ii) a date associated with each attribute of the one or more attributes; collect historical event information from one or more online sources;
wherein the historical event information is associated with a plurality of historical events;
wherein the historical event information comprises a date associated with each event of the plurality of historical events;
generate at least one event-dependent products training dataset based at least in part on the product information and the historical event information;
wherein the at least one event-dependent products training dataset defines for at least one product of the plurality of products:
at least one event of the plurality of historical events that is associated with (a) at least one attribute of the one or more attributes of the at least one product, (b) at least one attribute change of the at least one product, or (c) both (a) and (b);
train an attribute prediction machine learning model based at least in part on the at least one event-dependent products training dataset to generate a trained attribute prediction machine learning model;
collect additional event information from the one or more online sources;
wherein the additional event information is associated with one or more additional events;
wherein the additional event information comprises a date associated with each event of the one or more additional events;
apply the trained attribute prediction machine learning model to the additional event information to predict, for at least one product of the plurality of products, (a) a future attribute estimate, (b) a future attribute change estimate, or (c) both (a) and (b); and
cause to display at least one indication representative of (a) the future attribute estimate, (b) the future attribute change estimate, or (c) both (a) and (b), on a screen.

While one or more embodiments of the present disclosure have been described, it is understood that these embodiments are illustrative only, and not restrictive, and that many modifications may become apparent to those of ordinary skill in the art, including that various embodiments of the inventive methodologies, the inventive systems, and the inventive devices described herein can be utilized in any combination with each other. Further still, the various steps may be carried out in any desired order (and any desired steps may be added and/or any desired steps may be eliminated).

The invention claimed is:

1. A method comprising:
configuring, by at least one processor, a web browser of a user computing device to install a recommendation add-on to the web browser that cause the web browser to automatically determine and present a forecasted price of at least one product to at least one user associated with the user computing device upon the at least one user selecting to view at least one webpage associated with the at least one product;
wherein the recommendation add-on is configured to cause the web browser to automatically detect the at least one product on the at least one webpage;
obtaining, by the at least one processor, upon the recommendation add-on detecting the at least one product on the at least one webpage and via at least one programmed call, historical product information for the at least one product;
wherein the product information comprises:
i) one or more identifying attributes, and
ii) a price across a plurality of dates;
obtaining, by the at least one processor, upon the recommendation add-on detecting the at least one product on the at least one webpage and via the at least one programmed call, historical event information from one or more online sources;
wherein the historical event information comprises:
a date associated with each historical event of a plurality of historical events, and
at least one content descriptive of each historical event;
utilizing, by the at least one processor, at least one similarity measurement algorithm to determine a similarity measure indicative of a similarity between the at least one content descriptive of each historical event and the one or more identifying attributes of the at least one product so as to determine a similarity between each historical event and the at least one product;
determining, by the at least one processor, at least one historical event associated with the at least one product based at least in part on the similarity measure exceeding a predetermined threshold similarity;
determining, by the at least one processor, at least one product impact of the at least one product based at least in part on:
the price having an impact comprising a fluctuation exceeding a predetermined impact fluctuation value over a duration exceeding a predetermined impact fluctuation duration and
the predetermined impact fluctuation duration being within the at least one historical event based at least in part on the date associated with each historical event of the plurality of historical events;
generating, by the at least one processor, at least one event-dependent products training dataset based at least in part on the product information of the at least one product impact and the historical event information;
wherein the at least one event-dependent products training dataset comprises the at least one product impact and the at least one historical event associated with the at least one product impact;
determining, by the at least one processor, an impact period for each historical event of the plurality of historical events based on the predetermined impact fluctuation duration;
training, by the at least one processor, an attribute prediction machine learning model based at least in part on the at least one event-dependent products training dataset to obtain a trained attribute prediction machine learning model;
wherein the trained attribute prediction machine learning model comprises a regression layer formed of model parameters trained to correlate the at least one historical event to:
the impact on of the at least one product, and
ii) the impact period of the at least one product;
receiving, by the at least one processor, upon the recommendation add-on detecting the at least one product on the at least one webpage and via the at least one programmed call, current event information for at least one current event, the current event information comprising at least one current content associated with the at least one product;
utilizing, by the at least one processor, upon the recommendation add-on detecting the at least one product on the at least one webpage, the attribute prediction machine learning model to output a forecasted price of the at least one product based on an input of the at least one current content based at least in part on the regression layer formed of the model parameters; and
causing to display, by the at least one processor via the recommendation add-on, the at least the forecasted price of the at least one product and an interface element in at least one user interface rendered on a display of the user computing device associated with the user, wherein the interface element is configured to enable the user to purchase the at least one product.

2. The method of claim 1, further comprising:
receiving, by the at least one processor, a plurality of additional events comprising a plurality of additional event information;
determining, by the at least one processor, a respective attribute impact period of one or more attribute impact periods associated with each respective additional event of the plurality of additional events based on a respective variation in a respective one or more attribute of each product following the respective additional event information of the plurality of additional event information;
wherein the attribute impact period comprises a set of dates for which the plurality of additional event information is correlated with each respective variation; and
determining, by the at least one processor, an impacted product dataset comprising each respective product of the plurality of products associated with each respective variation in the respective one or more attribute.

3. The method of claim 2, further comprising:
generating, by the at least one processor, a first training dataset comprising at least one subset of selected products;
generating, by the at least one processor, a second training dataset comprising the impacted product dataset; and
generating, by the at least one processor, a third training dataset comprising post-impact product information;
wherein the post-impact product information comprises respective product information of respective selected products of the subset of selected products having a respective date after each respective attribute impact period; and
wherein training the at least one attribute prediction machine learning model comprises training a first attribute prediction machine learning model with the first training dataset, a second attribute prediction machine learning model with the second training dataset, and a third attribute prediction machine learning model with the third training dataset.

4. The method of claim 2, further comprising:
determining, by the at least one processor, that at least one attribute impact period of one or more attribute impact periods has not ended;
generating, by the at least one processor, a first training dataset comprising at least one subset of selected products;
generating, by the at least one processor, a second training dataset comprising non-impacted product information;
wherein the non-impacted product information comprises respective product information of respective selected products of the subset of selected products having a respective attribute-posted date not during the at least one attribute impact period; and
wherein training the at least one attribute prediction machine learning model comprises training a first attribute prediction machine learning model with the first training dataset, and a second attribute prediction machine learning model with the second training dataset.

5. The method of claim 1, further comprising:
receiving, by the at least one processor, a prediction request from at least one computing device associated with a user;
wherein the prediction request comprising at least one particular product; and
utilizing, by the at least one processor, the trained attribute prediction machine learning model to predict a future impact period associated with the at least one particular product.

6. The method of claim 5, wherein the prediction request is generated by a user selection using an attribute prediction graphical user interface at the at least one computing device associated with the user.

7. The method of claim 1, wherein the product information further comprises a product category associated with each of the plurality of products.

8. The method of claim 7, further comprising:
causing, by the at least one processor, to display a product research graphical user interface (GUI) on a screen of the user computing device associated with the user;
wherein the product research GUI is configured to allow the user to define a category view for at least one product category associated with the at least one product; and
wherein the category view presents a purchase recommendation based on the forecasted price, at least one forecasted price change, or both, for the at least one product category.

9. The method of claim 1, further comprising:
detecting, by the at least one processor, a viewed product information displayed on a screen of the user computing device associated with the user;
receiving, by the at least one processor via an application programming interface (API), an automatic attribute prediction request for the viewed product information;
determining, by the at least one processor, at least one particular product based on the viewed product information;
determining, by the at least one processor, a cheapest date prediction based on the at least one particular product; and
wherein the cheapest date prediction is based on the forecasted price, at least one forecasted price change, or both predicted by the at least one attribute prediction machine learning model for the at least one particular product.

10. The method of claim 9, wherein the cheapest date prediction comprises a date within one year into the future.

11. A system comprising:
at least one processor in communication with a non-transitory computer readable medium storing software instruction, wherein the at least one processor is configured to execute the software instructions which, upon execution, cause the at least one processor to perform steps to:
configure a web browser of a user computing device to install a recommendation add-on to the web browser that cause the web browser to automatically determine and present a forecasted price of at least one product to at least one user associated with the user computing device upon the at least one user selecting to view at least one webpage associated with the at least one product;
wherein the recommendation add-on is configured to cause the web browser to automatically detect the at least one product on the at least one webpage;
obtain, upon the recommendation add-on detecting the at least one product on the at least one webpage and via at least one programmed call, historical product information for the at least one product;
wherein the product information comprises:
i) one or more identifying attributes, and
ii) a price across a plurality of dates;
obtain, upon the recommendation add-on detecting the at least one product on the at least one webpage and via at least one programmed call, historical event information from one or more online sources;
wherein the historical event information comprises:
a date associated with each historical event of a plurality of historical events, and
at least one content descriptive of each historical event;
utilize at least one similarity measurement algorithm to determine a similarity measure indicative of a similarity between the at least one content descriptive of each historical event and the one or more identifying attributes of the at least one product so as to determine a similarity between each historical event and the at least one product;
determine at least one historical event associated with the at least one product based at least in part on the similarity measure exceeding a predetermined threshold similarity;
determine at least one product impact of the plurality of products based at least in part on:
the price having an impact comprising a fluctuation exceeding a predetermined impact fluctuation value over a duration exceeding a predetermined impact fluctuation duration and
the predetermined impact fluctuation duration being within the at least one historical event based at least in part on the date associated with each historical event of the plurality of historical events;
generate at least one event-dependent products training dataset based at least in part on the product information of the at least one product impact and the historical event information;
wherein the at least one event-dependent products training dataset comprises the at least one product impact of the at least one product and the at least one historical event associated with the at least one product impact;
determine an impact period for each historical event of the plurality of historical events based on the predetermined impact fluctuation duration;
train an attribute prediction machine learning model based at least in part on the at least one event-dependent products training dataset to obtain a trained attribute prediction machine learning model;
wherein the trained attribute prediction machine learning model comprises a regression layer formed of model parameters trained to correlate the at least one historical event to:
i) the impact on the at least one product, and
ii) the impact period of the at least one product;
receive, upon the recommendation add-on detecting the at least one product on the at least one webpage and via the at least one programmed call, current event information for at least one current event, the current event information comprising at least one current content associated with the at least one product;
utilize, upon the recommendation add-on detecting the at least one product on the at least one webpage, the attribute prediction machine learning model to output a forecasted price of the at least one product based on an input of the at least one current content based at least in part on the regression layer formed of the model parameters; and
cause to display, via the recommendation add-on, the at least the forecasted price of the at least one product and an interface element in at least one user interface rendered on a display of the user computing device associated with the user, wherein the interface element is configured to enable the user to purchase the at least one product.

12. The system of claim 11, wherein the at least one processor is configured to execute the software instructions which, upon execution, further cause the at least one processor to perform steps to:
  receive a plurality of additional events comprising a plurality of additional event information;
  determine a respective attribute impact period of one or more attribute impact periods associated with each respective additional event of the plurality of additional events based on a respective variation in a respective one or more attribute of each product following the respective additional event information of the plurality of additional event information;
    wherein the attribute impact period comprises a set of dates for which the plurality of additional event information is correlated with each respective variation; and
  determine an impacted product dataset comprising each respective product of the plurality of products associated with each respective variation in the respective one or more attribute.

13. The system of claim 12, wherein the at least one processor is configured to execute the software instructions which, upon execution, further cause the at least one processor to perform steps to:
  generate a first training dataset comprising at least one subset of selected products;
  generate a second training dataset comprising the impacted product dataset; and
  generate a third training dataset comprising post-impact product information;
    wherein the post-impact product information comprises respective product information of respective selected products of the subset of selected products having a respective date after each respective attribute impact period; and
    wherein training the at least one attribute prediction machine learning model comprises training a first attribute prediction machine learning model with the first training dataset, a second attribute prediction machine learning model with the second training dataset, and a third attribute prediction machine learning model with the third training dataset.

14. The system of claim 12, wherein the at least one processor is configured to execute the software instructions which, upon execution, further cause the at least one processor to perform steps to:
  determine that at least one attribute impact period of one or more attribute impact periods has not ended;
  generate a first training dataset comprising at least one subset of selected products;
  generate a second training dataset comprising non-impacted product information;
    wherein the non-impacted product information comprises respective product information of respective selected products of the subset of selected products having a respective attribute-posted date not during the at least one attribute impact period; and
    wherein training the at least one attribute prediction machine learning model comprises training a first attribute prediction machine learning model with the first training dataset, and a second attribute prediction machine learning model with the second training dataset.

15. The system of claim 11, wherein the at least one processor is configured to execute the software instructions which, upon execution, further cause the at least one processor to perform steps to:
  receive a prediction request from at least one computing device associated with a user;
    wherein the prediction request comprising at least one particular product; and
  utilize the trained attribute prediction machine learning model to predict a future impact period associated with the at least one particular product.

16. The system of claim 15, wherein the prediction request is generated by a user selection using an attribute prediction graphical user interface at the at least one computing device associated with the user.

17. The system of claim 11, wherein the product information further comprises a product category associated with each of the plurality of products.

18. The system of claim 17, wherein the at least one processor is configured to execute the software instructions which, upon execution, further cause the at least one processor to perform steps to:
  cause to display a product research graphical user interface (GUI) on a screen of the user computing device associated with the user;
    wherein the product research GUI is configured to allow the user to define a category view for at least one product category associated with the at least one product; and
    wherein the category view presents a purchase recommendation based on the forecasted price, at least one forecasted price change, or both, for each of the at least one product category.

19. The system of claim 11, wherein the at least one processor is configured to execute the software instructions which, upon execution, further cause the at least one processor to perform steps to:
  detect a viewed product information displayed on a screen of the user computing device associated with the user;
  receiving, by the at least one processor via an application programming interface (API), an automatic attribute prediction request for the viewed product information;
  determine at least one particular product based on the viewed product information;
  determine a cheapest date prediction based on the at least one particular product; and
    wherein the cheapest date prediction is based on the forecasted price, at least one forecasted price change, or both predicted by the at least one attribute prediction machine learning model for the at least one particular product.

20. The system of claim 19, wherein the cheapest date prediction comprises a date within one year into the future.

* * * * *